(12) United States Patent
Wang et al.

(10) Patent No.: US 8,811,359 B2
(45) Date of Patent: Aug. 19, 2014

(54) MULTIPLEXING OF PEER-TO-PEER (P2P) COMMUNICATION AND WIDE AREA NETWORK (WAN) COMMUNICATION

(75) Inventors: Renqiu Wang, San Diego, CA (US);
Dung Ngoc Doan, San Diego, CA (US);
Ravi Palanki, San Diego, CA (US);
Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 244 days.

(21) Appl. No.: 13/085,322

(22) Filed: Apr. 12, 2011

(65) Prior Publication Data

US 2011/0255450 A1  Oct. 20, 2011

Related U.S. Application Data

(60) Provisional application No. 61/324,612, filed on Apr. 15, 2010.

(51) Int. Cl.
*H04W 4/00* (2009.01)
*H04W 72/04* (2009.01)
*H04W 84/18* (2009.01)
*H04W 76/02* (2009.01)

(52) U.S. Cl.
CPC .......... *H04W 72/0493* (2013.01); *H04W 84/18* (2013.01); *H04W 76/023* (2013.01)
USPC ....................................................... 370/338

(58) Field of Classification Search
USPC .................. 370/280, 343, 345, 338
See application file for complete search history.

(56) References Cited

U.S. PATENT DOCUMENTS 6,845,087 B1 * 1/2005 Holdrege et al. ............. 370/335
7,069,060 B2 * 6/2006 Kimata et al. ................ 455/574

(Continued)

FOREIGN PATENT DOCUMENTS

JP  2007500988 A  1/2007
JP  2009017560 A  1/2009

(Continued)

OTHER PUBLICATIONS

CATT: "Design of Relay Frame Timing in LTE-A" 3GPP Draft; R1-100027, 3rd Generation Partnership Project (3GPP), Mobile Competence Centre; 650, Route Des Lucioles; F-06921 Sophia-Antipolis Cedex; France, vol. RAN WG1, No. Valencia, Spain; Jan. 18, 2010, Jan. 12, 2010, XP050417783, [retrieved on Jan. 12, 2010] Sections 1, 2 and 3.

(Continued)

*Primary Examiner* — Mark Rinehart
*Assistant Examiner* — Mohammad Anwar
(74) *Attorney, Agent, or Firm* — James K. O'Hare

(57) ABSTRACT

Techniques for supporting peer-to-peer (P2P) communication and wide area network (WAN) communication are disclosed. In one aspect, P2P communication may be supported on an uplink spectrum. A user equipment (UE) may communicate (i) with a base station on both a downlink spectrum and an uplink spectrum for WAN communication and (ii) with another UE on only the uplink spectrum for P2P communication. In another aspect, P2P communication may be supported by time division multiplexing the downlink and uplink (or transmit and receive links) for two UEs. In yet another aspect, WAN communication and P2P communication may be time division multiplexed, so that both can be concurrently supported by a UE. In yet another aspect, transmission gaps may be provided between WAN transmissions and P2P transmissions in order to avoid interference between these transmissions.

49 Claims, 19 Drawing Sheets

(56) References Cited

U.S. PATENT DOCUMENTS

| | | | |
|---|---|---|---|
| 7,333,824 B2* | 2/2008 | Zhang et al. | 455/502 |
| 2003/0103473 A1* | 6/2003 | Warich et al. | 370/318 |
| 2005/0239451 A1 | 10/2005 | Periyalwar et al. | |
| 2008/0002658 A1* | 1/2008 | Soliman | 370/343 |
| 2009/0011770 A1 | 1/2009 | Jung et al. | |

FOREIGN PATENT DOCUMENTS

| | | |
|---|---|---|
| WO | WO2004103009 | 11/2004 |
| WO | WO2009009264 | 1/2009 |
| WO | WO-2009009614 A2 | 1/2009 |
| WO | WO2010026287 A1 | 3/2010 |

OTHER PUBLICATIONS

International Search Report and Written Opinion—PCT/US2011/032681—ISA/EPO—Oct. 7, 2011.

Qualcomm Incorporated: "Access-backhaul 35-55 timing relationship for UL", 3GPP Draft; R1-102343 Access-Backhaul Timing Relationship for UL.

3RD Generation Partnership Project (3GPP), Mobile Competence Centre; 650, Route Des Lucioles ; F-06921 Sophia-Antipolis Cedex; France, vol. RAN WGI, No. Beijing, china; Apr. 12, 2010, Apr. 6, 2010, XP050419572, [retrieved on Apr. 6, 2010] Sections 1 and 2 figures 1, 2.

Samsung: "Guard period in UL backhaul 35-55 subframes", 3GPP Draft; R1-091870 Guard Period in UL Backhaul Subframes, 3RD Generation Partnership Project (3GPP), Mobile Competence Centre ; 650, Route Des Lucioles ; F-06921 Sophia-Antipolis Cedex ; France, No. San Francisco, USA; Apr. 28, 2009, XP050339366, [retrieved on Apr. 28, 2009] Section 3 and Figure 1.

Tao Peng et al., "Interference avoidance mechanisms in the hybrid cellular and device-to-device systems", IEEE 20th International Symposium on Personal, Indoor and Mobile Radio Communications (PIMRC 2009), IEEE, Piscataway, NJ, USA, Sep. 13, 2009, pp. 617-621, XP031659660, ISBN: 978-1-4244-5122-7 abstract, chapters I, II, III.

3GPP TS 36.211, "3rd Generation Partnership Project; Technical Specification Group Radio Access Network; Evolved Universal Terrestrial Radio Access (E-UTRA) Physical Channels and Modulation (Release 9)", (Mar. 2010), pp. 1-85, V9.1.0.

Taiwan Search Report—TW100113217—TIPO—Oct. 14, 2013.

\* cited by examiner

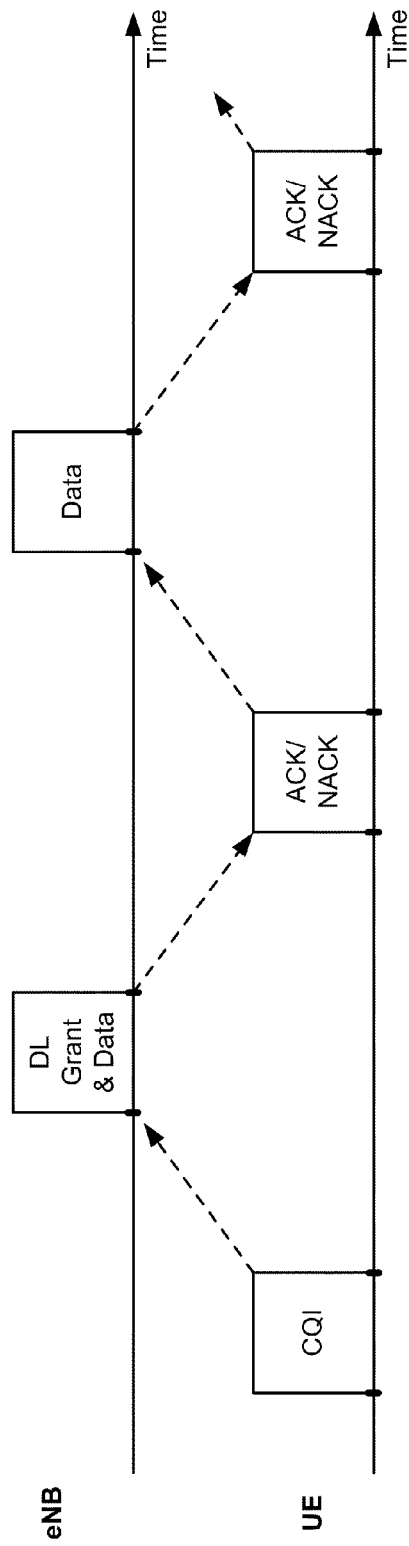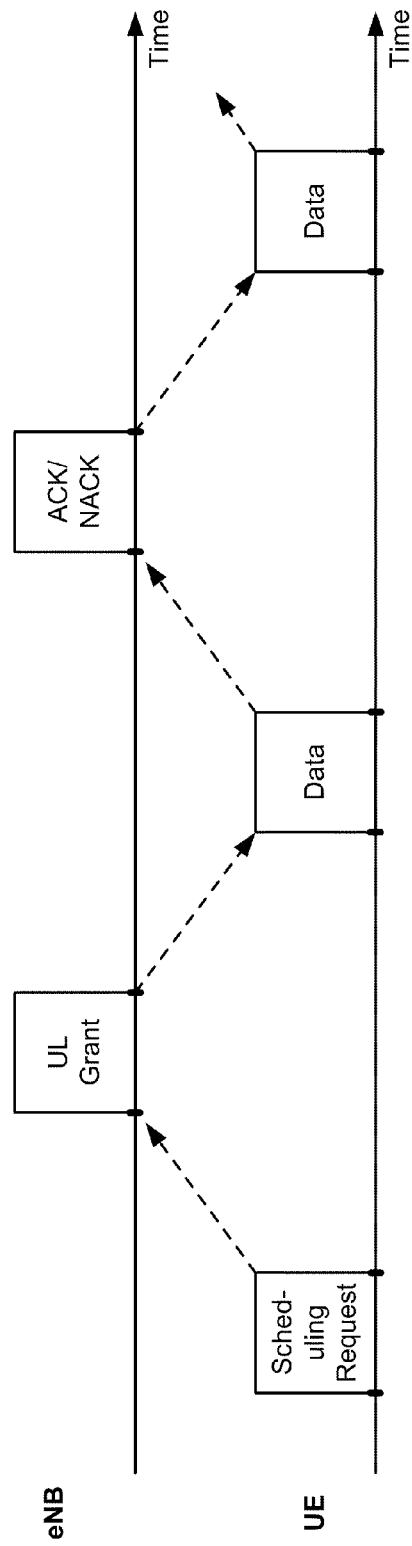

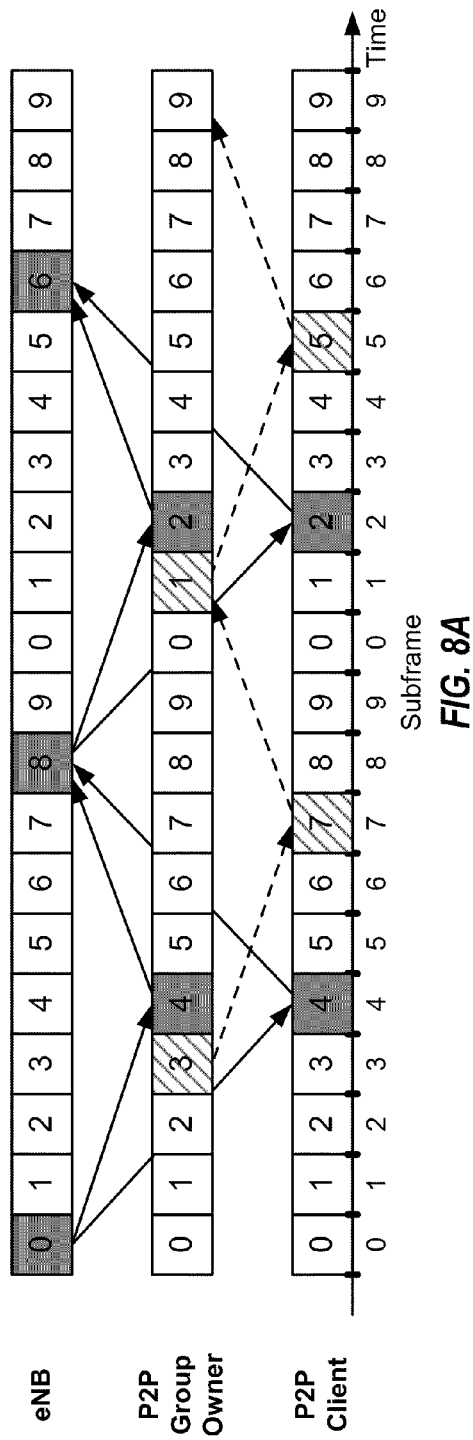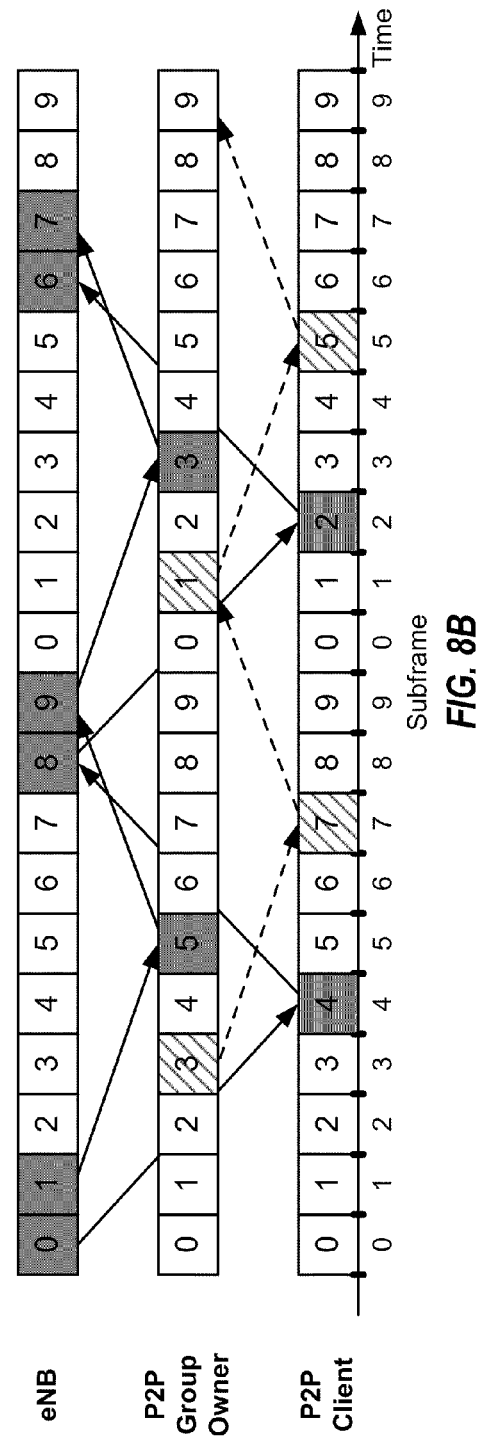

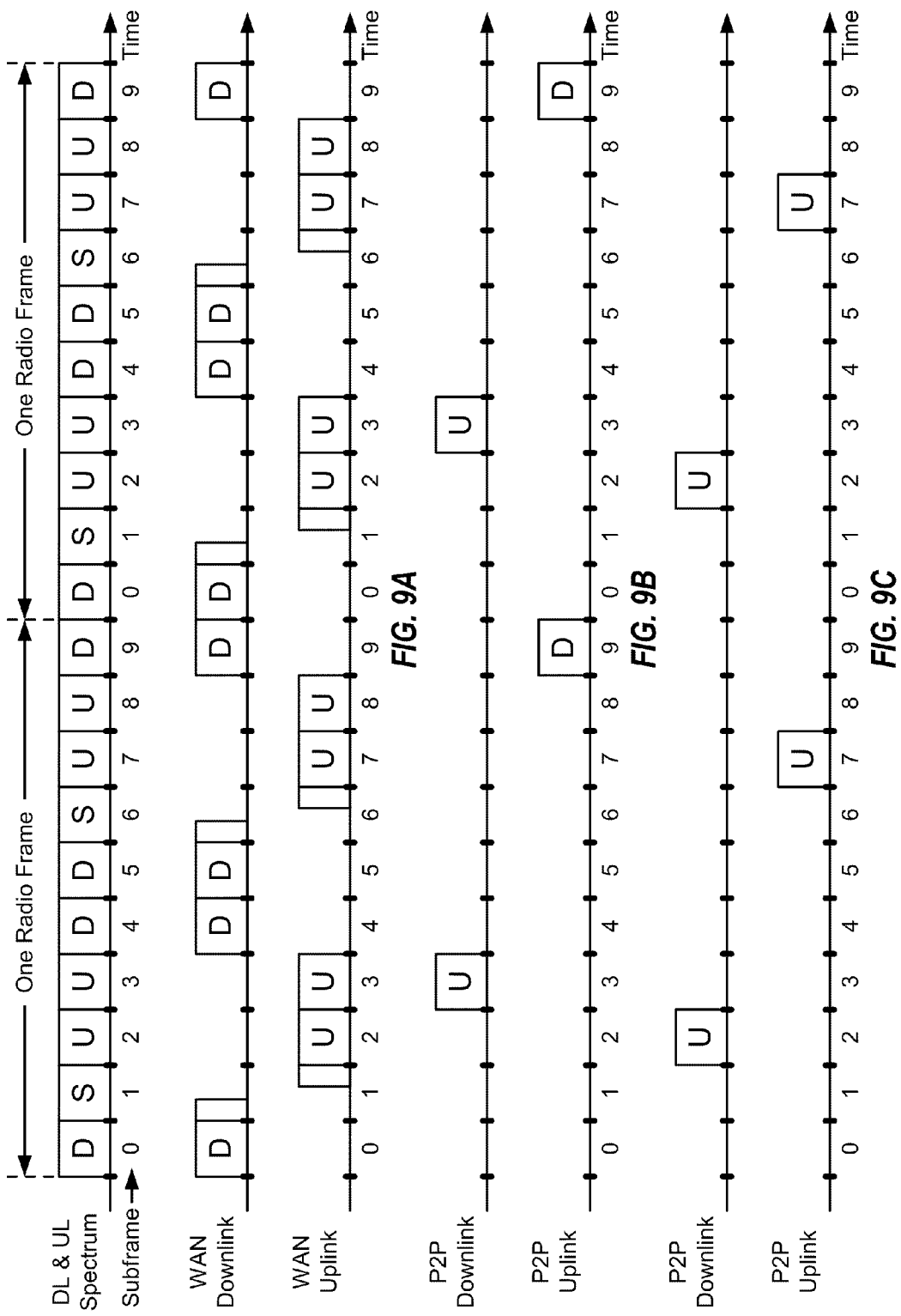

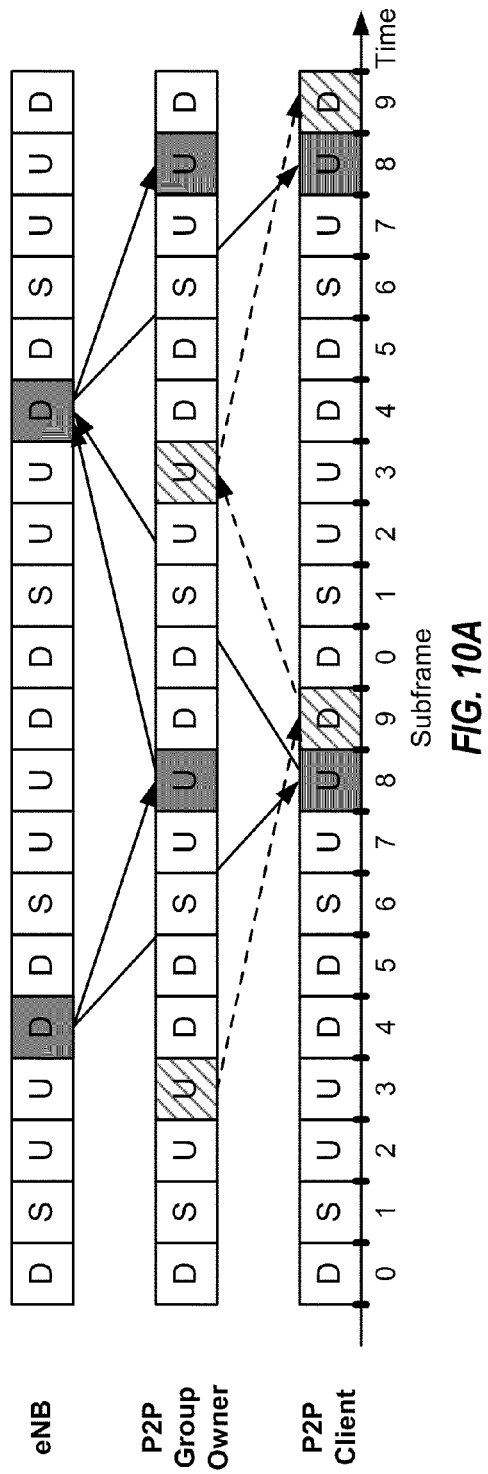
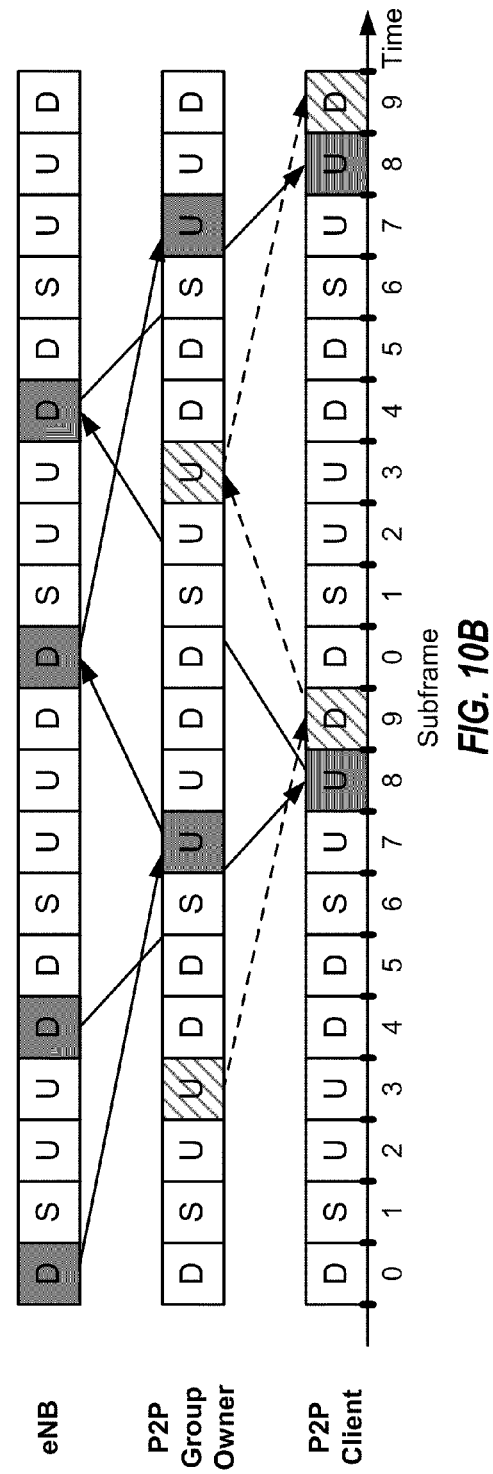
FIG. 10A
FIG. 10B

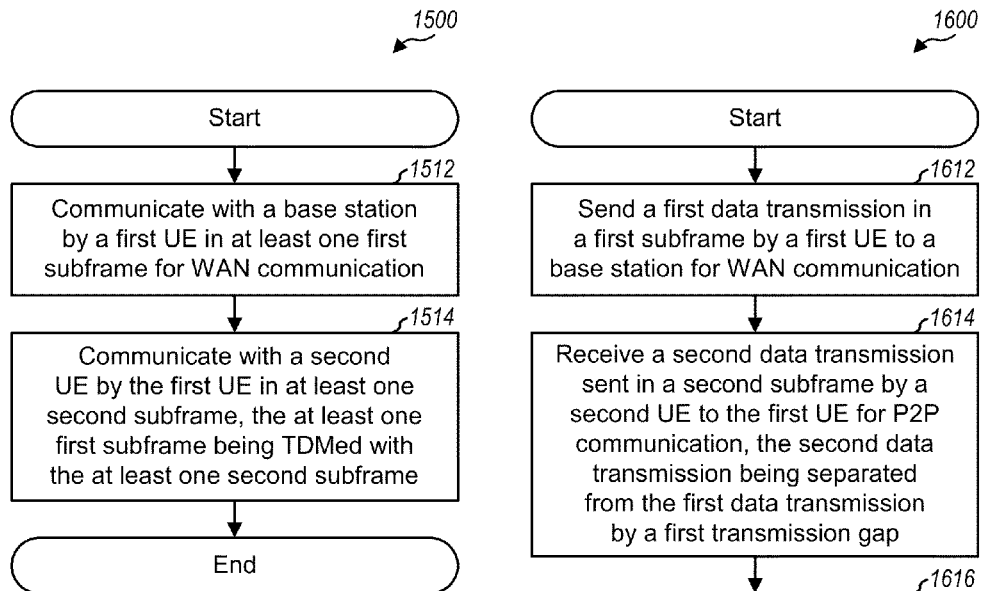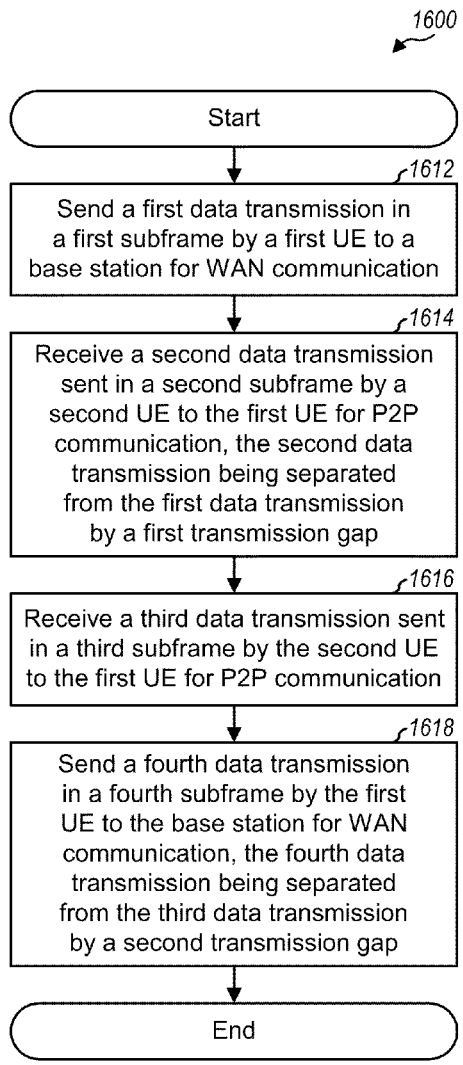
FIG. 15
FIG. 16

MULTIPLEXING OF PEER-TO-PEER (P2P) COMMUNICATION AND WIDE AREA NETWORK (WAN) COMMUNICATION

The present application claims priority to provisional U.S. Application Ser. No. 61/324,612, entitled "PEER-TO-PEER COMMUNICATIONS IN LONG TERM EVOLUTION SYSTEM," filed Apr. 15, 2010, and incorporated herein by reference in its entirety.

BACKGROUND

I. Field

The present disclosure relates generally to communication, and more specifically to techniques for supporting peer-to-peer (P2P) communication.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks. A wireless communication network may also be referred to as a wide area network (WAN).

A wireless communication network may include a number of base stations that can support communication for a number of user equipments (UEs). A UE may communicate with a base station. A UE may also be able to communicate peer-to-peer with one or more other UEs. It may be desirable to efficiently support P2P communication for UEs.

SUMMARY

Techniques for supporting P2P communication and WAN communication are described herein. In one aspect, P2P communication may be supported on an uplink spectrum used by a WAN in a frequency division duplex (FDD) deployment. In one design, a UE may communicate with a base station on both a downlink spectrum and an uplink spectrum for WAN communication. The UE may communicate with another UE on only the uplink spectrum for P2P communication. P2P transmissions may be time division multiplexed (TDMed) and/or frequency division multiplexed (FDMed) with WAN transmissions on the uplink spectrum.

In another aspect, P2P communication may be supported by time division multiplexing the downlink and uplink (or transmit and receive links) for two UEs. In one design, a first UE may transmit data to a second UE on a spectrum in a first subframe for P2P communication. The first UE may receive data sent by the second UE to the first UE on the same spectrum in a second subframe for P2P communication. The first subframe may be time division multiplexed with the second subframe. The spectrum may be an uplink spectrum, a dedicated spectrum, etc.

In yet another aspect, WAN communication and P2P communication may be time division multiplexed, so that both can be concurrently supported by a UE. In one design, a first UE may communicate with a base station in at least one first subframe for WAN communication. The first UE may communicate with a second UE in at least one second subframe, which may be time division multiplexed with the at least one first subframe. The first UE may be able to concurrently communicate with the base station and the second UE in different subframes.

In yet another aspect, transmission gaps may be provided between WAN transmissions and P2P transmissions in order to avoid interference between these transmissions. In one design, a first UE may send a first data transmission in a first subframe to a base station for WAN communication. The first UE may receive a second data transmission sent in a second subframe by a second UE to the first UE for P2P communication. The second data transmission may be separated from the first data transmission by a transmission gap, which may be obtained in various manners as described below.

Various aspects and features of the disclosure are described in further detail below.

BRIEF DESCRIPTION OF THE DRAWINGS

FIGS. 4A and 4B show two examples of data transmission with HARQ.

FIGS. 8A and 8B show concurrent P2P communication and WAN communication for the subframe allocation shown in FIG. 7.

FIGS. 9A to 9C show allocation of subframes to P2P communication in TDD.

FIGS. 10A to 10D show concurrent P2P communication and WAN communication for the subframe allocation shown in FIGS. 9B and 9C.

FIG. 15 shows a process for supporting WAN communication and P2P communication.

FIG. 16 shows a process for obtaining transmission gaps between WAN transmissions and P2P transmissions.

DETAILED DESCRIPTION

The techniques described herein may be used for various wireless communication networks such as CDMA, TDMA, FDMA, OFDMA, SC-FDMA and other wireless networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both FDD and TDD, are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
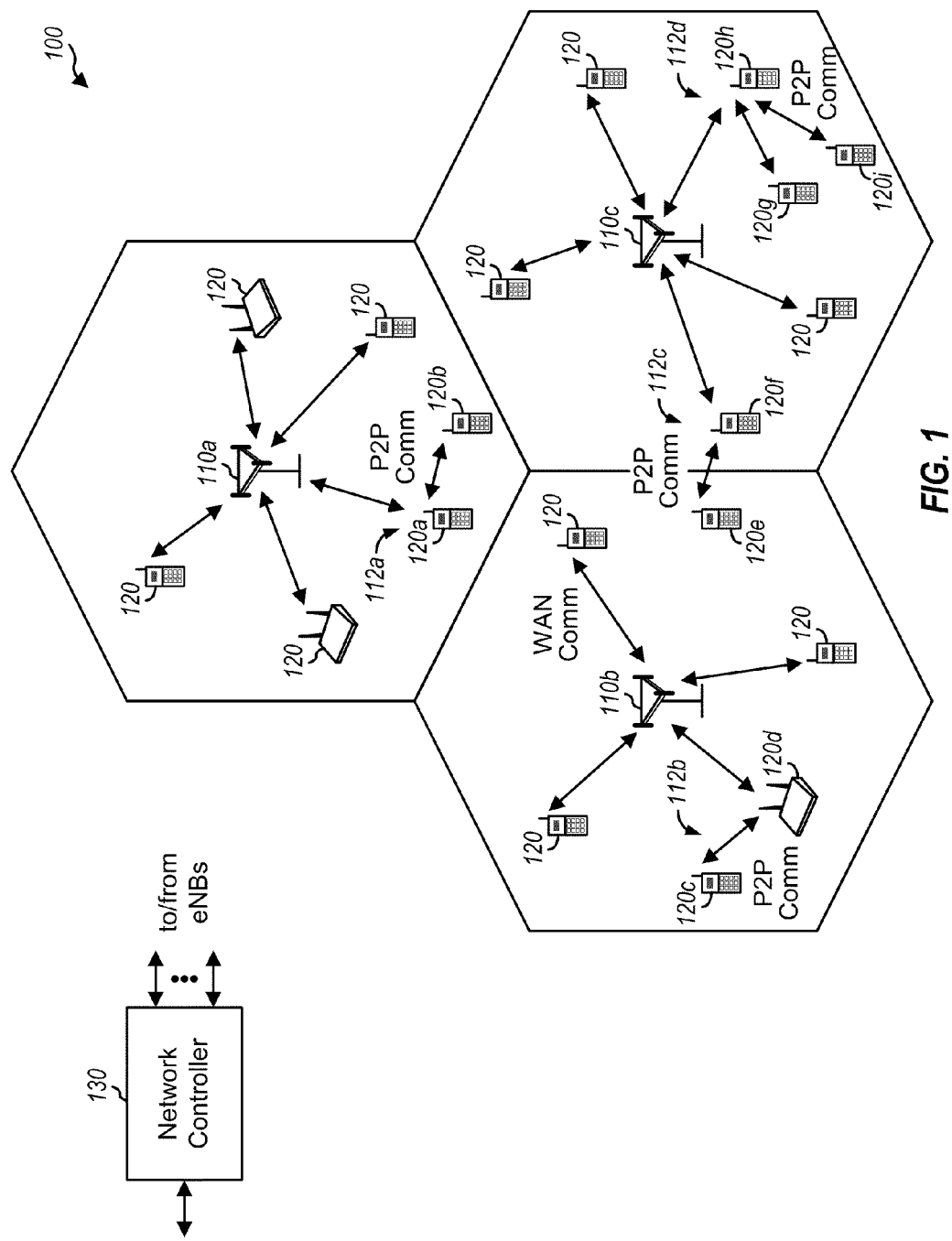
FIG. 1 shows a wireless network supporting P2P communication.

FIG. 1 shows a WAN 100, which may be a LTE network or some other WAN. WAN 100 may include a number of evolved Node B (eNB) and other network entities. For simplicity, only three eNBs 110a, 110b and 110c and one network controller 130 are shown in FIG. 1. An eNB may be an entity that communicates with the UEs and may also be referred to as a base station, a Node B, an access point, etc. Each eNB may provide communication coverage for a particular geographic area and may support communication for the UEs located within the coverage area. In 3GPP, the term "cell" can refer to a coverage area of an eNB and/or an eNB subsystem serving this coverage area, depending on the context in which the term is used. In 3GPP2, the term "sector" or "cell-sector" can refer to a coverage area of a base station and/or a base station subsystem serving this coverage area. For clarity, 3GPP concept of "cell" is used in the description herein.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). In the example shown in FIG. 1, WAN 100 includes macro eNBs 110a, 110b and 110c for macro cells. WAN 100 may also include pico eNBs for pico cells and/or home eNBs (HeNBs) for femto cells (not shown in FIG. 1).

WAN 100 may also include relays. A relay may be an entity that receives a transmission of data from an upstream entity (e.g., an eNB or a UE) and sends a transmission of the data to a downstream entity (e.g., a UE or an eNB). A relay may also be a UE that relays transmissions for other UEs.

Network controller 130 may couple to a set of eNBs and may provide coordination and control for these eNBs. Network controller 130 may communicate with the eNBs via a backhaul. The eNBs may also communicate with one another via the backhaul.

UEs 120 may be dispersed throughout WAN 100, and each UE may be stationary or mobile. A UE may also be referred to as a station, a mobile station, a terminal, an access terminal, a subscriber unit, etc. A UE may be a cellular phone, a personal digital assistant (PDA), a wireless modem, a wireless communication device, a handheld device, a laptop computer, a cordless phone, a wireless local loop (WLL) station, a smartphone, a netbook, a smartbook, a tablet, etc. A UE may be able to communicate with eNBs, relays, other UEs, etc.

In the description herein, WAN communication refers to communication between a UE and an eNB, e.g., for a call with a remote entity such as another UE. P2P communication refers to direct communication between two or more UEs, without going through an eNB. A WAN UE is a UE that is interested or engaged in WAN communication. A P2P UE is a UE that is interested or engaged in P2P communication.

In the example shown in FIG. 1, UEs 120a and 120b are within the coverage of eNB 110a and communicate peer-to-peer. UEs 120c and 120d are within the coverage of eNB 110b and communicate peer-to-peer. UEs 120e and 120f are within the coverage of different eNBs 110b and 110c and communicate peer-to-peer. UEs 120g, 120h and 120i are within the coverage of eNB 110c and communicate peer-to-peer. The other UEs 120 in FIG. 1 are engaged in WAN communication.

A group of two or more UEs may be engaged in P2P communication and may be referred to as a P2P group. In one design, which may be referred to as coordinated P2P, one UE in the P2P group may be designated as a P2P group owner (or a P2P server), and each remaining UE in the P2P group may be designated as a P2P client. The P2P server may perform certain management functions such as exchanging signaling with a WAN, coordinating data transmission between the P2P server and the P2P client(s), etc. In another design, which may be referred to as ad hoc P2P, all UEs in the P2P group may perform similar functions to transmit and/or receive data for P2P communication. In this design, no UE in the P2P group may be tasked with management functions for the P2P group. The techniques described herein may be used for both coordinated P2P and ad hoc P2P, with and without a P2P group owner. For clarity, much of the description below is for a case in which a P2P group owner communicates peer-to-peer with a P2P client.

In general, communication may be facilitated via transmissions on the downlink and uplink. For WAN communication, the downlink (or forward link) refers to the communication link from eNBs to UEs, and the uplink (or reverse link) refers to the communication link from UEs to eNBs. The downlink for WAN communication may also be referred to as WAN downlink, and the uplink for WAN communication may also be referred to as WAN uplink. For coordinated P2P communication, P2P downlink refers to the communication link from P2P group owners to P2P clients, and P2P uplink refers to the communication link from P2P clients to P2P group owners. For ad hoc P2P communication, P2P downlink may refer to the communication link from one particular UE to its peer UE(s), and P2P uplink may refer to the communication link from its peer UE(s) to this particular UE. P2P downlink and P2P uplink for ad hoc P2P may thus be symmetric and may differ only in direction.

WAN 100 may utilize FDD or TDD. For FDD, the downlink and uplink may be allocated two separate frequency channels, which may be referred to as a downlink spectrum and an uplink spectrum. Transmissions may be sent concurrently on the downlink spectrum and the uplink spectrum. For TDD, the downlink and uplink may share the same frequency channel or spectrum. Transmissions may be sent on the downlink and uplink on the same spectrum in different time intervals. In general, the term "spectrum" may generically refer to a range of frequencies, which may correspond to a frequency channel, a subband, etc.

Figure 2:
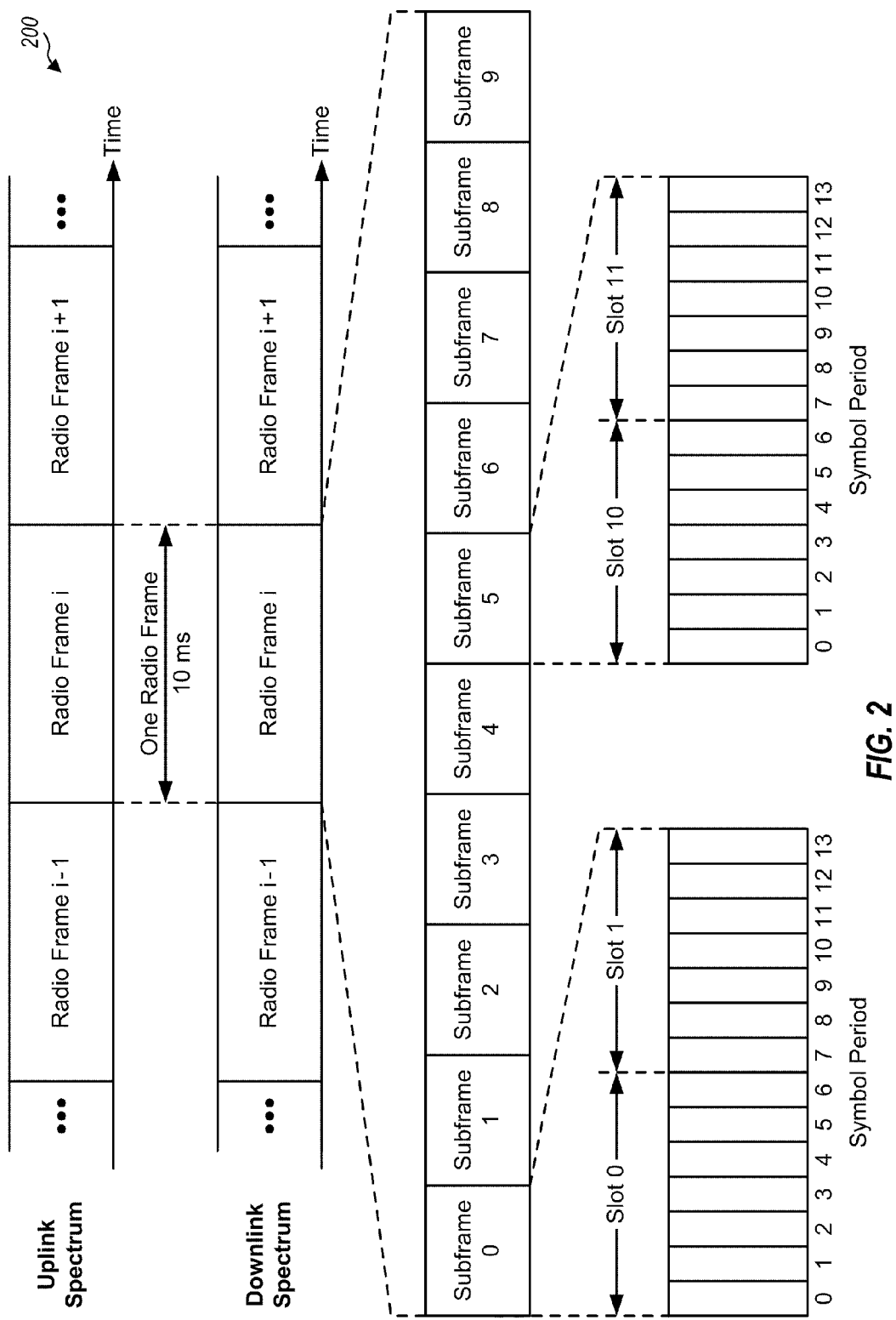
FIG. 2 shows a frame structure for frequency division duplexing (FDD).

FIG. 2 shows a frame structure 200 used for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L-1. For FDD, each subframe for the downlink spectrum may be referred to as a downlink subframe. Each subframe for the uplink spectrum may be referred to as an uplink subframe.

Figure 3:
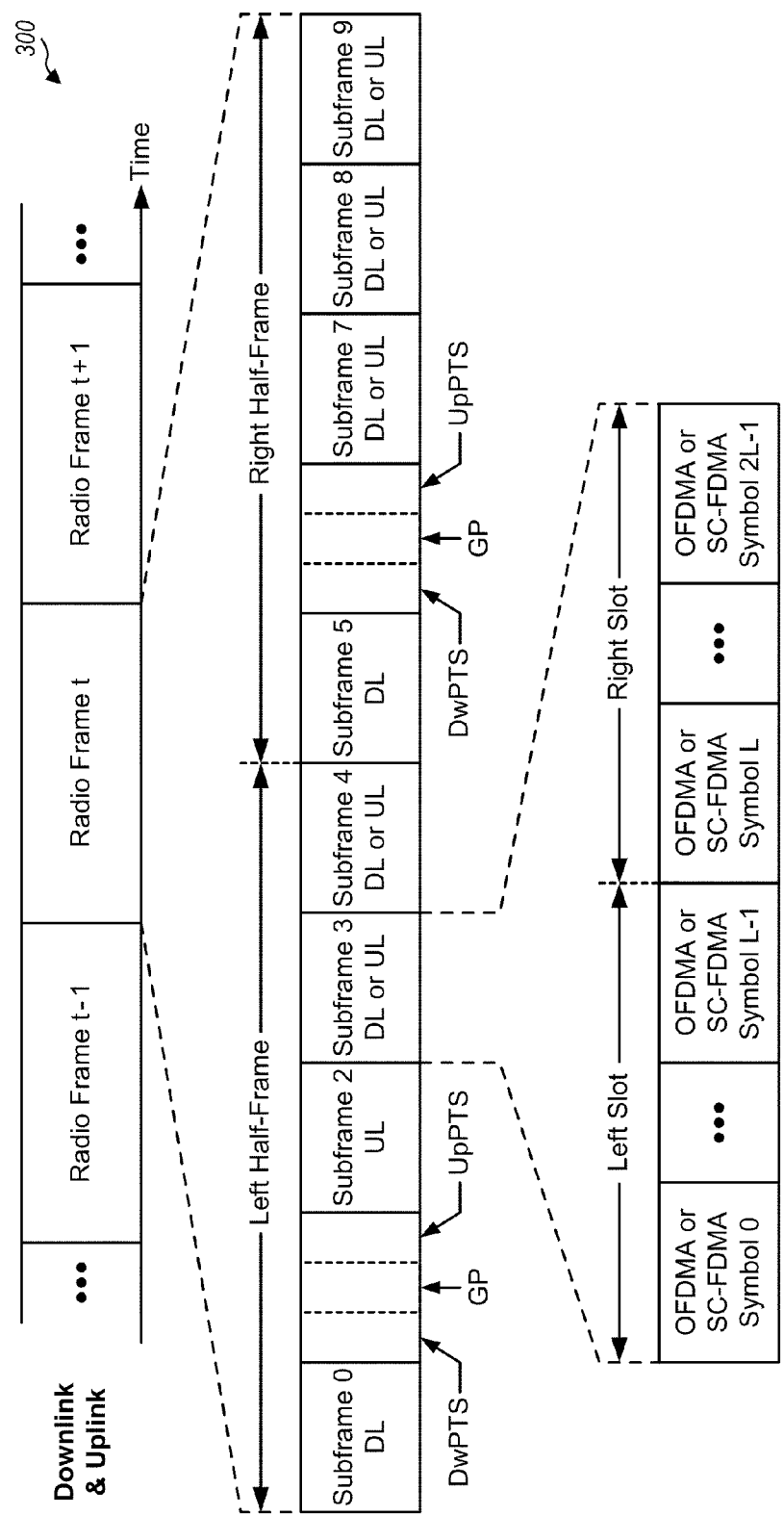
FIG. 3 shows a frame structure for time division duplexing (TDD).

FIG. 3 shows a frame structure 300 used for TDD in LTE. The transmission timeline may be partitioned into units of radio frames, and each radio frame may be partitioned into 10 subframes with indices of 0 through 9. LTE supports a number of downlink-uplink configurations for TDD. Subframes 0 and 5 are used for the downlink (DL) and subframe 2 is used for the uplink (UL) for all downlink-uplink configurations. Subframes 3, 4, 7, 8 and 9 may each be used for the downlink or uplink depending on the downlink-uplink configuration. Subframe 1 includes three special fields composed of a Downlink Pilot Time Slot (DwPTS) used for downlink control channels as well as data transmission, a Guard Period (GP) of no transmission, and an Uplink Pilot Time Slot (UpPTS) used for either a random access channel (RACH) or a sounding reference signals (SRS). Subframe 6 may include only the DwPTS, or all three special fields, or a downlink subframe depending on the downlink-uplink configuration. The DwPTS, GP and UpPTS may have different durations for different subframe configurations. For TDD, each subframe used for the downlink may be referred to as a downlink subframe. Each subframe used for the uplink may be referred to as an uplink subframe.

LTE utilizes orthogonal frequency division multiplexing (OFDM) on the downlink and single-carrier frequency division multiplexing (SC-FDM) on the uplink for both FDD and TDD. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, the subcarrier spacing may be 15 kilohertz (KHz), and $N_{FFT}$ may be equal to 128, 256, 512, 1024 or 2048 for system bandwidth of 1.25, 2.5, 5, 10 or 20 megahertz (MHz), respectively. The system bandwidth may also be partitioned into subbands. Each subband may cover a range of frequencies, e.g., 1.08 MHz For both FDD and TDD, an OFDM symbol may be transmitted in each symbol period of a downlink subframe. An SC-FDMA symbol may be transmitted in each symbol period of an uplink subframe.

WAN 100 may support data transmission with hybrid automatic retransmission (HARQ) to improve reliability. For HARQ, a transmitter may send an initial transmission of a packet of data and may send one or more additional transmissions of the packet, if needed, until the packet is decoded correctly by a receiver, or the maximum number of transmissions has been sent for the packet, or some other termination condition is encountered.

FIG. 4A shows an example of data transmission on the downlink with HARQ. A UE may estimate the channel quality of the downlink for an eNB and may send channel quality indicator (CQI) indicative of the downlink channel quality to the eNB. The eNB may schedule the UE for data transmission on the downlink and may select a modulation and coding scheme (MCS) based on the CQI. The eNB may send a downlink grant and a transmission of a packet to the UE. The downlink grant may include the selected MCS, the assigned resources, etc. The UE may process the data transmission from the eNB, send an acknowledgement (ACK) if the packet is decoded correct, or send a negative acknowledgement (NACK) if the packet is decoded in error. The eNB may send another transmission of the packet if a NACK is received and may terminate transmission of the packet if an ACK is received. Data transmission on the downlink and ACK/NACK feedback on the uplink may continue in similar manner.

FIG. 4B shows an example of data transmission on the uplink with HARQ. A UE may have data to transmit and may send a scheduling request to an eNB. The eNB may schedule the UE for data transmission on the uplink and may send an uplink grant to the UE. The uplink grant may include a selected MCS, the assigned resources, etc. The UE may send a transmission of a packet in accordance with the uplink grant. The eNB may process the data transmission from the UE and may send an ACK or a NACK depending on the decoding result. The UE may send another transmission of the packet if a NACK is received and may terminate transmission of the packet if an ACK is received. Data transmission on the uplink and ACK/NACK feedback on the downlink may continue in similar manner.

Figure 5:
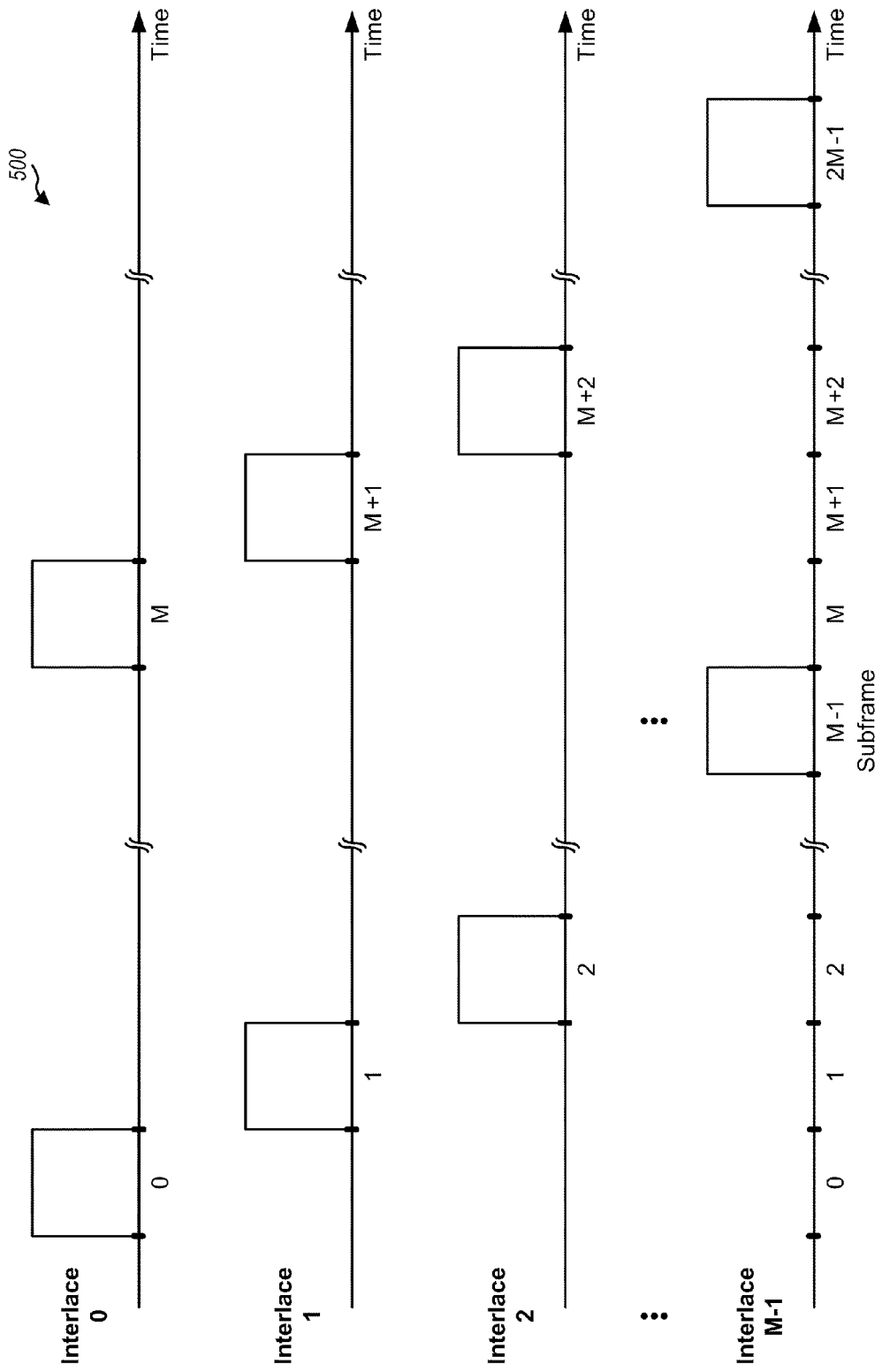
FIG. 5 shows an interlace transmission structure.

FIG. 5 shows an exemplary interlace transmission structure 500 that may be used for each of the downlink and uplink. M interlaces with indices of 0 through M-1 may be defined, where M may be equal to 4, 6, 8 or some other value. Each interlace may include subframes that are spaced apart by M subframes. For example, interlace m may include subframes m, m+M, m+2M, etc. The M interlaces may be used for HARQ and may be referred to as HARQ interlaces, HARQ processes, etc. For HARQ, a transmitter may send all transmissions of a packet in different subframes of the same interlace. The transmitter may send transmissions of different packets in different interlaces.

As shown in FIGS. 4A and 4B, data transmission on the downlink and/or uplink may be supported with one interlace on each link. For data transmission on the downlink, data may be sent in subframes of the interlace for the downlink, and ACK/NACK feedback may be sent in subframes of the interlace for the uplink. For data transmission on the uplink, data may be sent in subframes of the interlace for the uplink, and ACK/NACK feedback may be sent in subframes of the interlace for the downlink. More interlaces may be used for each link to increase capacity, reduce delay, and/or obtain other benefits.

P2P communication may offer certain advantages over WAN communication, especially for UEs located close to each other. In particular, efficiency may improve because the pathloss between two UEs may be substantially smaller than the pathloss between either UE to its serving eNB. Furthermore, the two UEs may communicate directly via a single transmission "hop" for P2P communication instead of via two transmission hops for WAN communication—one hop for the uplink from one UE to its serving eNB and another hop for the downlink from the same or different eNB to the other UE. P2P communication may thus be used to improve UE capacity and also to improve network capacity by shifting some load over to P2P communication.

In general, P2P communication may be supported on the same spectrum used by WAN 100 in a co-channel P2P deployment or on a different spectrum not used by WAN 100. Co-channel P2P deployment may be used, for example, when a separate spectrum is not available to support P2P communication. Much of the description below assumes a co-channel P2P deployment. However, the techniques described herein may also be applied to P2P deployment with a dedicated spectrum as well.

In an aspect, P2P communication may be supported on an uplink spectrum used by a WAN in a FDD deployment. Due to regulatory constraints, it may be difficult or not possible to support P2P communication on both the downlink spectrum and the uplink spectrum used by the WAN in FDD. Hence, P2P communication may be supported on the uplink spectrum by allocating some of the available time-frequency resources on the uplink spectrum to P2P communication.

In another aspect, a frame structure may be defined with TDM partitioning between WAN communication and P2P communication, so that both can be concurrently supported by a UE. This may be achieved by allocating some subframes to P2P communication and using the remaining subframes for WAN communication. In yet another aspect, TDM partitioning may be used for P2P downlink and P2P uplink, which may enable a UE to operate on the same spectrum for both P2P downlink and P2P uplink. This may be achieved by using some subframes allocated to P2P communication for P2P downlink and using the remaining allocated subframes for P2P uplink.

Figure 6C:
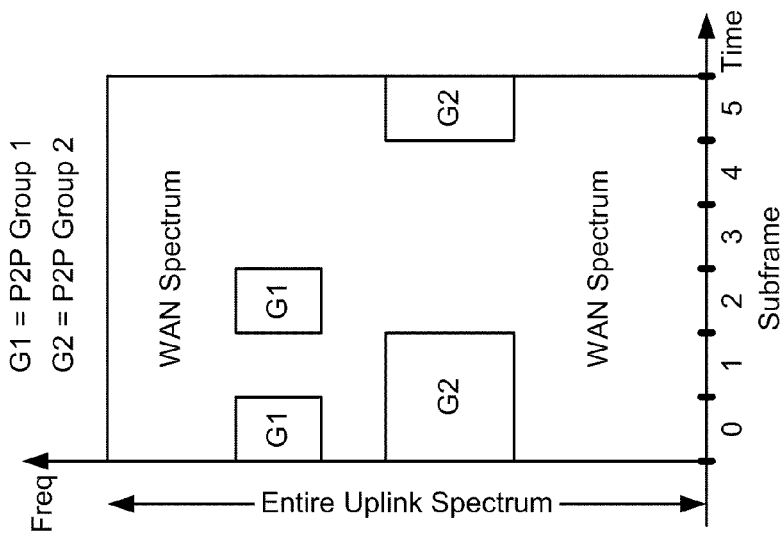
FIGS. 6A to 6C show three resource partitioning schemes to support P2P communication.
Figure 6B:
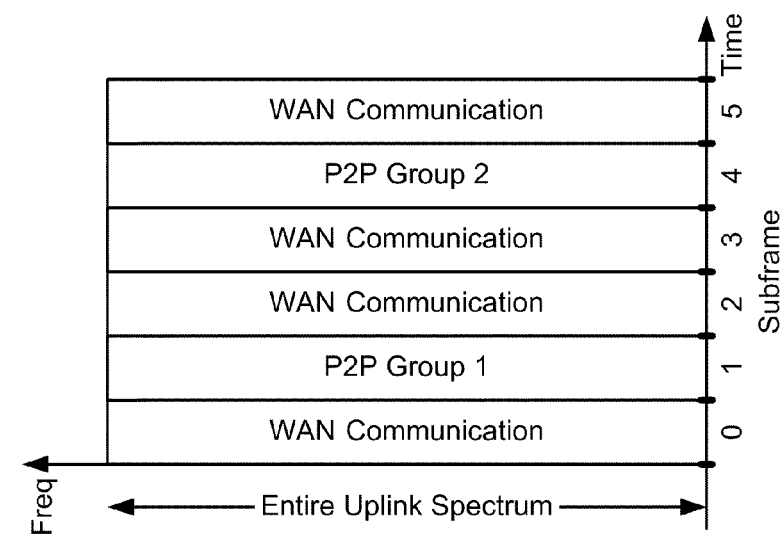
Figure 6A:
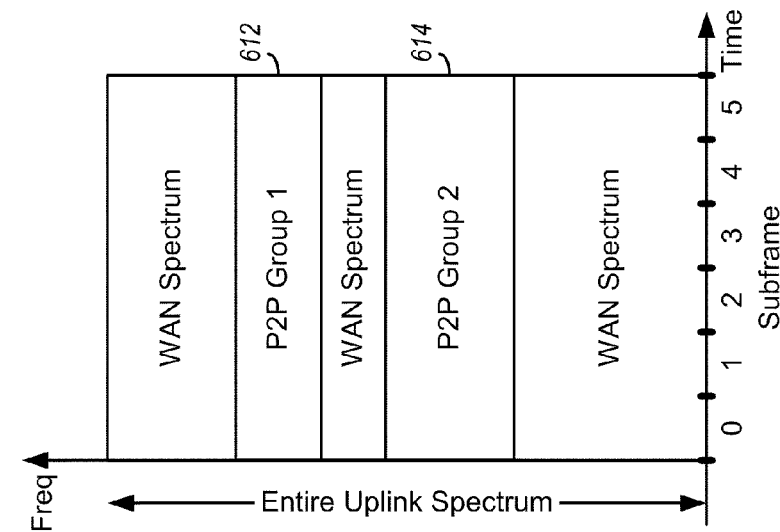

FIG. 6A shows a design of supporting P2P communication on the uplink spectrum with frequency division multiplexing (FDM). In this design, a portion of the uplink spectrum may be assigned to a group of UEs for the entire duration of P2P communication. Different groups of UEs may be assigned different non-overlapping portions of the uplink spectrum. For example, a first group of UEs may be assigned a first portion 612 and a second group of UEs may be assigned a second portion 614 of the uplink spectrum. The remaining portion of the uplink spectrum may be used for WAN communication.

FIG. 6B shows a design of supporting P2P communication on the uplink spectrum with time division multiplexing (TDM). In this design, some subframes for the uplink spectrum may be assigned to UEs for P2P communication. Different groups of UEs may be assigned different subframes or possibly the same subframes if they do not cause excessive interference to one another. The remaining subframes for the uplink spectrum may be used for WAN communication.

FIG. 6C shows a design of supporting P2P communication on the uplink spectrum with both FDM and TDM. In this design, a portion of the uplink spectrum in some subframes may be assigned to a group of UEs for P2P communication. Different groups of UEs may be assigned different non-overlapping portions of the uplink spectrum and/or in different subframes. For example, a first group of UEs (G1) may be assigned a first portion of the uplink spectrum in subframes 0 and 2. A second group of UEs (G2) may be assigned a second portion of the uplink spectrum in subframes 0, 1 and 5. The remaining time-frequency resources on the uplink spectrum may be used for WAN communication.

For the FDM design shown in FIG. 6A, a TDD frame structure may be used for the P2P downlink and P2P uplink. For each P2P group, some subframes may be allocated to the P2P downlink, and the remaining subframes may be allocated to the P2P uplink. Each P2P UE may transmit data on the assigned portion of the uplink spectrum in some subframes and may receive data on the assigned portion of the uplink spectrum in other subframes. However, it may be difficult for a P2P UE to concurrently support P2P communication and WAN communication since the P2P UE may be required to (i) receive data on the uplink spectrum from another UE for P2P communication and (ii) transmit data on the uplink spectrum to an eNB for WAN communication in the same subframe. The P2P UE may be unable to simultaneously transmit and receive on the same spectrum due to signal leakage from a transmitter to a receiver within the UE.

For the TDM design shown in FIG. 6B and the FDM-TDM design shown in FIG. 6C, a TDD frame structure may also be used for the P2P downlink and P2P uplink. Each P2P UE may then transmit data on all or a portion of the uplink spectrum in some subframes and may receive data on all or a portion of the uplink spectrum in other subframes. A P2P UE may also be able to concurrently support P2P communication and WAN communication since they are TDMed and occur in different subframes, as shown in FIGS. 6B and 6C.

The designs shown in FIGS. 6A to 6C may be used for a FDD deployment, and P2P communication may be supported on the uplink spectrum, as described above. The designs shown in FIGS. 6A to 6C may also be used for a TDD deployment, and P2P communication may be supported in uplink subframes (or some downlink and uplink subframes) in an analogous manner.

For clarity, much of the description below assumes P2P communication being supported (i) on the uplink spectrum in a FDD deployment or (ii) in only uplink subframes or both downlink and uplink subframes in a TDD deployment. Much of the description below also assumes the use of the FDM-TDM design shown in FIG. 6C and a TDD frame structure for P2P communication.

In a FDD deployment, M interlaces may be defined for each of the downlink and uplink, e.g., as shown in FIG. 5. One interlace for the uplink may be allocated to P2P communication. Half of the subframes in this interlace may be used for the P2P downlink, and the other half of the subframes in this interlace may be used for the P2P uplink. In this case, a transmission of data may be sent in subframe t, ACK/NACK feedback may be sent in subframe t+M, another transmission of data may be sent in subframe t+2M, etc. Sending ACK/NACK feedback M subframes after data transmission may not be suitable for delay sensitive services (e.g., voice). Hence, multiple interlaces may be allocated to P2P communication in order to reduce delay.

Figure 7:
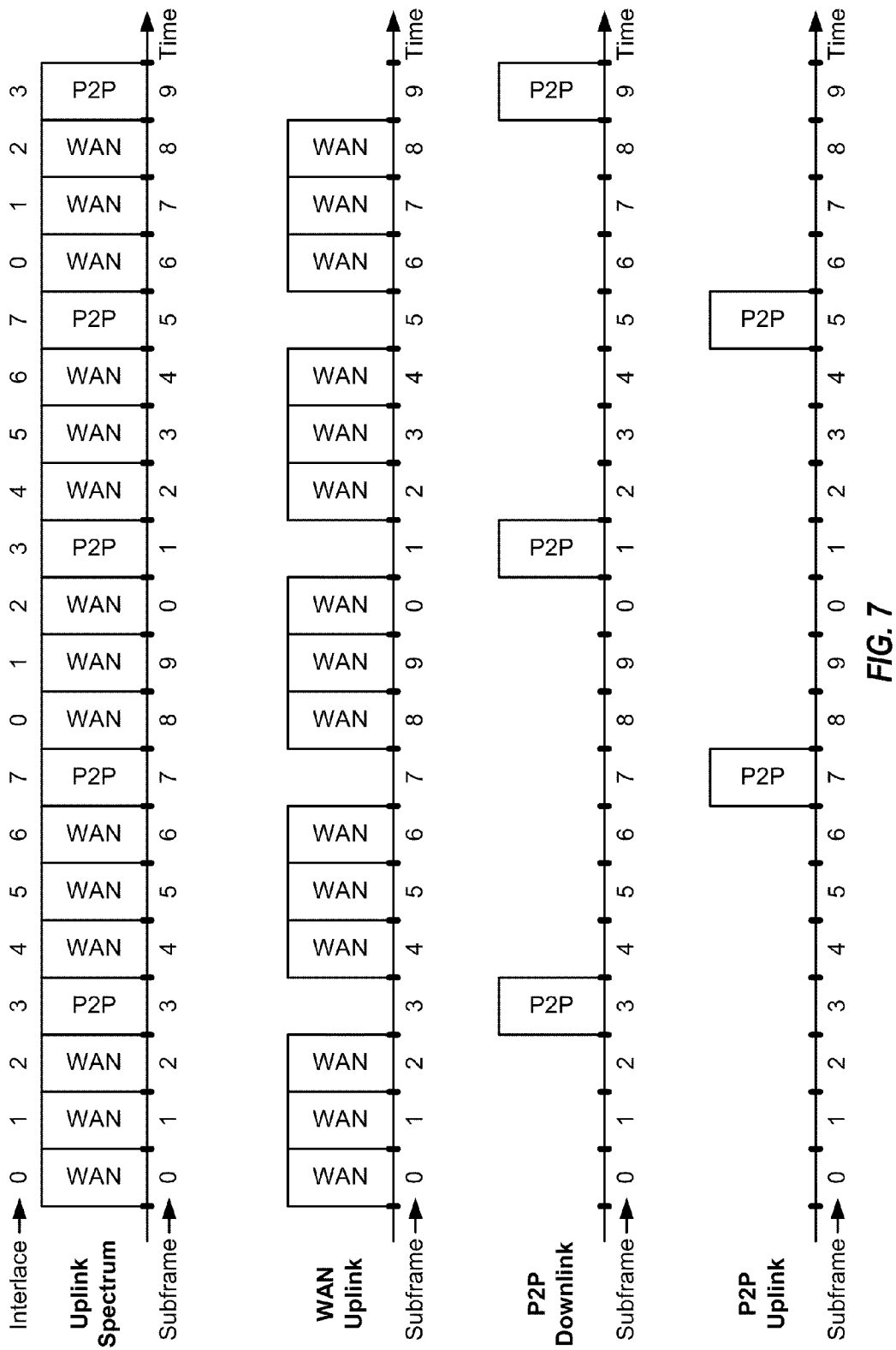
FIG. 7 shows allocation of subframes to P2P communication in FDD.

FIG. 7 shows an exemplary allocation of subframes for the uplink spectrum in a FDD deployment to P2P communication. In the example shown in FIG. 7, eight interlaces 0 to 7 are available for the uplink, two interlaces 3 and 7 are allocated to P2P communication, and the remaining six interlaces are used for WAN communication. Subframes in interlaces 0-2 and 4-6 may be used for the WAN uplink. Subframes in interlace 3 may be used for the P2P downlink. Subframes in interlace 7 may be used for the P2P uplink.

As shown in FIG. 7, two evenly spaced interlaces (e.g., interlaces 3 and 7) may be allocated to P2P communication. Furthermore, the subframes in the two allocated interlaces may be evenly allocated to the P2P downlink and P2P uplink. An 8 ms HARQ transmission timeline may then be supported for P2P communication.

A P2P group owner and a P2P client may communicate in subframes allocated to P2P downlink and P2P uplink. An eNB may transmit to the P2P group owner and the P2P client in subframes of either the same interlace or different interlaces, as long as these subframes are different from the subframes for the P2P downlink and P2P uplink.

FIG. 8A shows one design of concurrent P2P communication and WAN communication for the subframe allocation shown in FIG. 7. In the design shown in FIG. 8A, an eNB may send a data transmission to a P2P group owner in subframe 0, receive ACK/NACK feedback from the P2P group owner in subframe 4, and send another data transmission to the P2P group owner in subframe 8. Similarly, the eNB may send a data transmission to a P2P client in subframe 0, receive ACK/NACK feedback from the P2P client in subframe 4, and send another data transmission to the P2P client in subframe 8. The eNB may thus transmit data to the P2P group owner and P2P client in the same interlace in FIG. 8A.

FIG. 8B shows another design of concurrent P2P communication and WAN communication for the subframe allocation shown in FIG. 7. In the design shown in FIG. 8B, an eNB may send a data transmission to a P2P group owner in subframe 1, receive ACK/NACK feedback from the P2P group owner in subframe 5, and send another data transmission to the P2P group owner in subframe 9. The eNB may send a data transmission to a P2P client in subframe 0, receive ACK/NACK feedback from the P2P client in subframe 4, and send another data transmission to the P2P client in subframe 8. The eNB may thus transmit data to the P2P group owner and P2P client in different interlaces in FIG. 8B.

For both FIGS. 8A and 8B, the P2P group owner may send a data transmission to the P2P client in subframe 3, receive ACK/NACK feedback in subframe 7, and send another data transmission in subframe 1 of the next radio frame. Similarly, the P2P client may send a data transmission to the P2P group owner in subframe 7, receive ACK/NACK feedback in subframe 1 of the next radio frame, and send another data transmission in subframe 5 of the next radio frame.

FIG. 9A shows an exemplary allocation of subframes to the downlink and uplink in a TDD deployment. In the example shown in FIG. 9A, downlink-uplink configuration 1 is selected for use, subframes 0, 4, 5 and 9 of each radio frame are allocated to the downlink and are denoted with label "D" in FIG. 9A. Subframes 2, 3, 7 and 8 of each radio frame are allocated to the uplink and are denoted with label "U". Subframes 1 and 6 are special subframes and are denoted with label "S".

FIG. 9B shows a design of allocating both downlink subframes and uplink subframes in a TDD deployment to P2P communication. FIG. 9B assumes downlink-uplink configuration 1 shown in FIG. 9A is selected for use. In the example shown in FIG. 9B, uplink subframe 3 and downlink subframe 9 of each radio frame may be allocated to P2P communication, with subframe 3 being used for the P2P downlink, and subframe 9 being used for the P2P uplink. This design may reduce impact to HARQ transmission timeline for P2P communication. However, care should be taken to ensure that transmissions from P2P UEs on the downlink subframes do not cause excessive interference to WAN UEs.

FIG. 9C shows a design of allocating only uplink subframes in a TDD deployment to P2P communication. FIG. 9C assumes downlink-uplink configuration 1 shown in FIG. 9A is selected for use. In the example shown in FIG. 9C, uplink subframes 2 and 7 of each radio frame may be allocated to P2P communication, with subframe 2 being used for the P2P downlink, and subframe 7 being used for the P2P uplink. This design may avoid interference from the P2P UEs to the WAN UEs on the downlink. However, the uplink subframes may not be distributed across a radio frame for some downlink-uplink configurations, and the subframes allocated to P2P communication may also not be distributed across a radio frame. In this case, the HARQ transmission timeline for P2P communication may be modified as needed based on the subframes allocated to P2P communication.

FIG. 10A shows one design of concurrent P2P communication and WAN communication for the subframe allocation shown in FIG. 9B. An eNB may send data transmissions to a P2P group owner and a P2P client in subframe 4, receive ACK/NACK feedback in subframe 8, and send additional data transmissions to the P2P group owner and P2P client in subframe 4 of the next radio frame. The eNB may thus transmit data to the P2P group owner and P2P client in the same subframe in FIG. 10A.

FIG. 10B shows another design of concurrent P2P communication and WAN communication for the subframe allocation shown in FIG. 9B. An eNB may send a data transmission to a P2P group owner in subframe 0, receive ACK/NACK feedback from the P2P group owner in subframe 7, and send another data transmission to the P2P group owner in subframe 0 of the next radio frame. The eNB may send a data transmission to a P2P client in subframe 4, receive ACK/NACK feedback from the P2P client in subframe 8, and send another data transmission to the P2P client in subframe 4 of the next radio frame. The eNB may thus transmit data to the P2P group owner and P2P client in different subframes in FIG. 10B.

For both FIGS. 10A and 10B, the P2P group owner may send a data transmission to the P2P client in subframe 3, receive ACK/NACK feedback in subframe 9, and send another data transmission in subframe 3 of the next radio frame. Similarly, the P2P client may send a data transmission to the P2P group owner in subframe 9, receive ACK/NACK feedback in subframe 3 of the next radio frame, and send another data transmission in subframe 9 of the next radio frame.

Figure 10C:
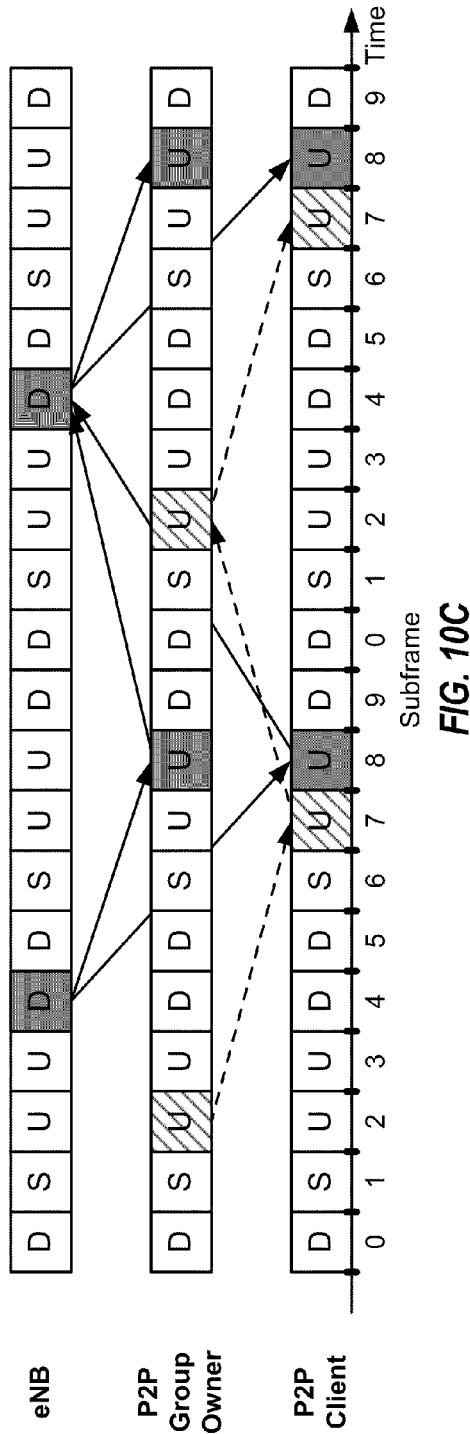

FIG. 10C shows one design of concurrent P2P communication and WAN communication for the subframe allocation shown in FIG. 9C. An eNB may send data transmissions to a P2P group owner and a P2P client in subframe 4, receive ACK/NACK feedback in subframe 8, and send additional data transmissions to the P2P group owner and P2P client in subframe 4 of the next radio frame. The eNB may thus transmit data to the P2P group owner and P2P client in the same subframe in FIG. 10C.

Figure 10D:
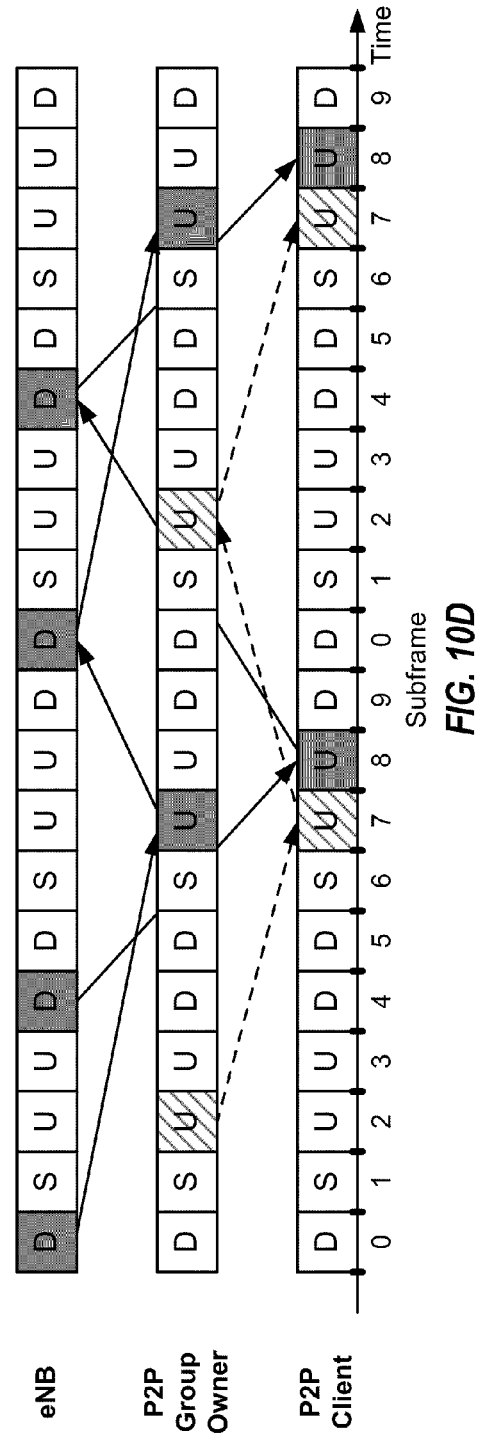

FIG. 10D shows another design of concurrent P2P communication and WAN communication for the subframe allocation shown in FIG. 9C. An eNB may send a data transmission to a P2P group owner in subframe 0, receive ACK/NACK feedback from the P2P group owner in subframe 7, and send another data transmission to the P2P group owner in subframe 0 of the next radio frame. The eNB may send a data transmission to a P2P client in subframe 4, receive ACK/NACK feedback from the P2P client in subframe 8, and send another data transmission to the P2P client in subframe 4 of the next radio frame. The eNB may thus transmit data to the P2P group owner and P2P client in different subframes in FIG. 10D.

For both FIGS. 10C and 10D, the P2P group owner may send a data transmission to the P2P client in uplink subframe 2, receive ACK/NACK feedback in uplink subframe 7, and send another data transmission in uplink subframe 2 of the next radio frame. Similarly, the P2P client may send a data transmission to the P2P group owner in uplink subframe 7, receive ACK/NACK feedback in uplink subframe 2 of the next radio frame, and send another data transmission in uplink subframe 7 of the next radio frame.

The HARQ transmission timing for P2P communication using only uplink subframes in FIGS. 10C and 10D is different from the HARQ transmission timing for P2P communication using both downlink and uplink subframes in FIGS. 10A and 10B. The P2P group owner and P2P client may be aware of the difference and may transmit data and ACK/NACK feedback in the proper subframes.

For both FDD and TDD deployments, it may be desirable to maintain the HARQ transmission timeline for WAN communication between an eNB and a UE, e.g., as specified in LTE standard. This may be achieved by properly scheduling UEs for communication with eNBs and/or properly allocating interlaces to P2P communication. Furthermore, concurrent P2P communication and WAN communication may be supported by reserving at least one interlace for the uplink for WAN communication between the eNB and the UE.

FIGS. 7 through 10D show examples in which two interlaces are allocated to P2P communication. More than two interlaces may also be allocated to P2P communication, e.g., to increase throughput for P2P communication. The HARQ transmission timeline for P2P communication may be extended to cases where more than two interlaces are allocated to P2P communication. For example, the HARQ transmission timeline for P2P communication may be defined to satisfy a 3-subframe processing time requirement, which means that ACK/NACK feedback should be at least three subframes later than a data transmission and/or another data transmission should be at least three subframes later than the ACK/NACK feedback. ACK bundling may be used to satisfy the processing time requirement by (i) bundling or combining ACKs and/or NACKs for data transmissions sent on different interlaces and (ii) sending bundled ACK/NACK in subframes that will satisfy the processing time requirement.

As noted above, a UE may not be able to transmit and receive signals on the same spectrum at the same time in order to avoid interference and also leakage from a transmitter to a receiver at the UE. This may be ensured by having a gap in transmission (i.e., a transmission gap) whenever the UE switches between transmit and receive (TX/RX) or between receive and transmit (RX/TX) on the same spectrum.

In yet another aspect, various techniques may be used to ensure a transmission gap at each TX/RX switchpoint and also at each RX/TX switchpoint on the same spectrum. Transmission gap requirements may differ for FDD and TDD deployments. Hence, techniques to obtain transmission gaps are described separately for FDD and TDD below.

For clarity, much of the description below is for a particular UE having concurrent P2P communication and WAN communication. The following terminology is used in the description below:

WAN TX—the UE transmits data to an eNB for WAN communication,

WAN RX—the UE receives data from an eNB for WAN communication,

P2P TX—the UE transmits data to a peer UE for P2P communication,

P2P RX—the UE receives data from a peer UE for P2P communication,

WAN TX timing—transmit timing of the UE for WAN communication,

WAN RX timing—receive timing of the UE for WAN communication, and

P2P timing—transmit and receive timing of the UE for P2P communication.

WAN TX, WAN RX, P2P TX and P2P RX are from the perspective of the UE. WAN TX timing, WAN RX timing, and P2P timing are given for the UE.

For TDD, the same spectrum is used for both WAN communication and P2P communication. Furthermore, the same spectrum is used for WAN downlink, WAN uplink, P2P downlink, and P2P uplink. Hence, WAN communication can potentially interfere with P2P communication, and vice versa. Table 1 lists different ways of ensuring transmission gaps for different TX/RX and RX/TX switchpoints in TDD, in accordance with one design.

TABLE 1

Obtaining Transmission Gaps in TDD

| Transmission gap between . . . | Solution |
|---|---|
| WAN TX and WAN RX | Advance WAN TX timing relative to WAN RX timing. |
| WAN RX and WAN TX | Use gap in special subframe. |
| P2P TX and WAN RX | Advance P2P timing relative to WAN RX timing |
| WAN RX and P2P TX | Advance P2P timing relative to WAN RX timing. |
| WAN TX and P2P RX | Schedule to avoid this, or puncture last symbol, or delay P2P timing relative to WAN TX timing, or use special subframe. |
| P2P RX and WAN TX | Schedule to avoid this. |
| P2P TX and P2P RX | Schedule to avoid this. |
| P2P RX and P2P TX | Schedule to avoid this. |

Figure 11:
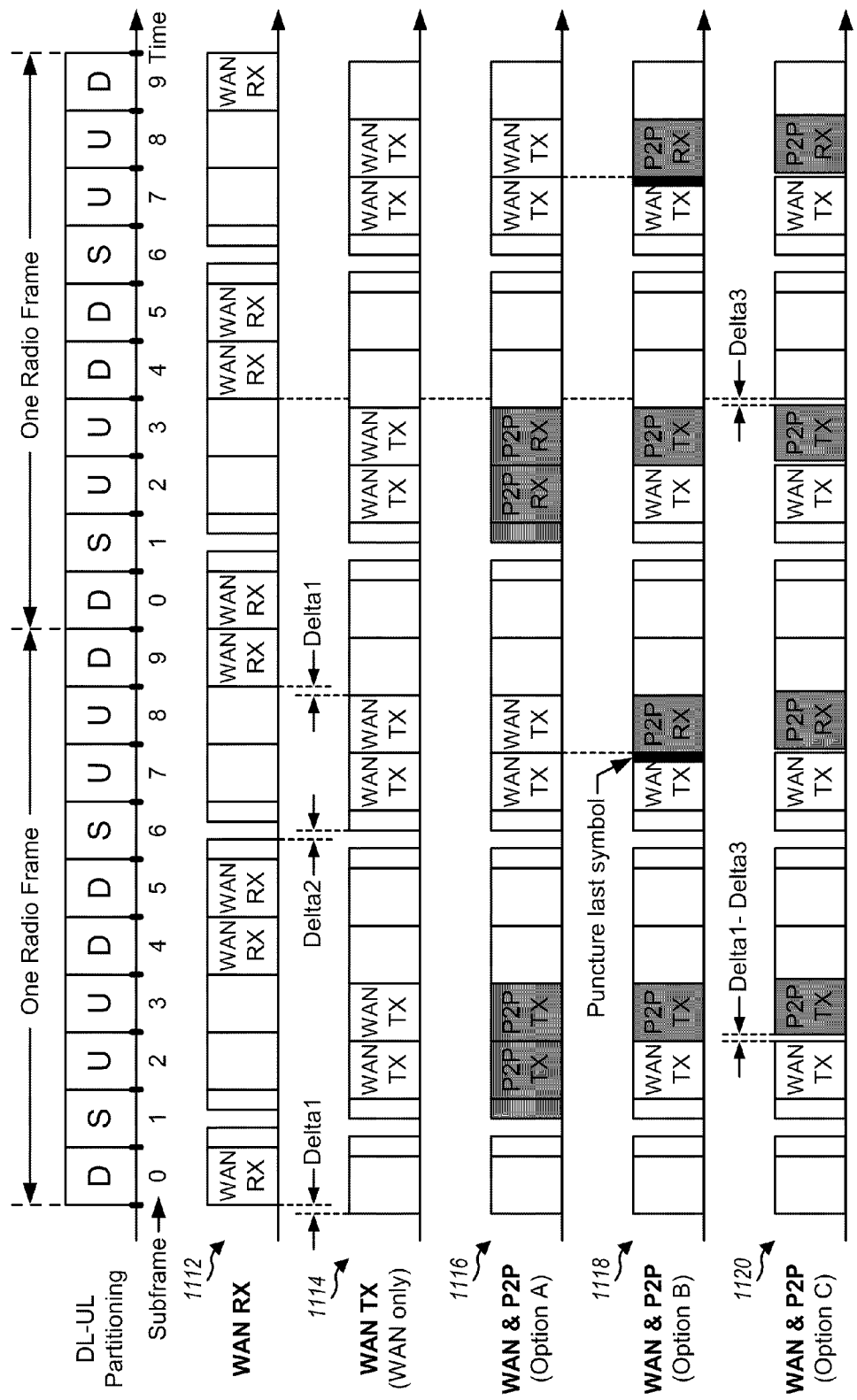
FIG. 11 shows some schemes for obtaining transmission gaps in TDD.

FIG. 11 shows several designs of ensuring transmission gaps for different TX/RX and RX/TX switchpoints in TDD. FIG. 11 assumes downlink-uplink configuration 1 being selected for use, with subframes 0, 4, 5 and 9 of each radio frame being allocated to the downlink, subframes 2, 3, 7 and 8 of each radio frame being allocated to the uplink, and subframes 1 and 6 being special subframes. Each special subframe includes a downlink portion, followed by a gap of Tgap, followed by an uplink portion, where Tgap may be configurable and dependent on the subframe configuration selected for use in TDD. FIG. 11 assumes that some uplink subframes are allocated to P2P communication. FIG. 11 also assumes a round trip delay (RTD) of zero for simplicity.

A WAN RX timeline 1112 shows the UE potentially receiving data from an eNB in downlink subframes 0, 4, 5 and 9 and also in the downlink portion of special subframes 1 and 6 in each radio frame. A WAN TX timeline 1114 shows the UE potentially transmitting data to the eNB in uplink subframes 2, 3, 7 and 8 and also in the uplink portion of special subframes 1 and 6 in each radio frame. WAN TX timeline 1114 may be applicable when the UE is engaged in only WAN communication (and not in P2P communication).

In one design, the WAN TX timing of the UE may be advanced by Delta1 ms relative to the WAN RX timing of the UE, as shown by timeline 1114 in FIG. 11. The uplink/transmit subframes of the UE may then be advanced by Delta1 relative to the downlink/receive subframes of the UE. A transmission gap of Delta1 may then be obtained between WAN TX and WAN RX, e.g., between uplink subframe 8 and downlink subframe 9. A transmission gap of Delta2 may be obtained between WAN RX and WAN TX, e.g., in special subframe 6, where Delta2 may be equal to (Tgap−Delta1). Delta1 may or may not be equal to Delta2.

A timeline 1116 shows a design of obtaining transmission gaps by bundling P2P TX subframes, P2P RX subframes, and WAN TX subframes. For the design shown in timeline 1116, the P2P timing of the UE may be similar to the WAN TX timing. Each group of consecutive uplink subframes may be separated from downlink subframes by transmission gaps that are obtained as described above for timeline 1114. The UE may either (i) transmit to the eNB and/or to a peer UE or (ii) receive from the peer UE in each group of consecutive uplink subframes. This would then avoid a TX/RX or a RX/TX switchpoint in any group of consecutive uplink subframes, which would then avoid the need for a transmission gap within any group of consecutive uplink subframes. The HARQ transmission timeline may be longer for P2P communication due to subframe bundling. A suitable downlink-uplink subframe configuration may be selected and/or a sufficient number of interlaces may be allocated to P2P communication to obtain the desired HARQ transmission timeline.

A timeline 1118 shows a design of obtaining transmission gaps by puncturing symbols. For the design shown in timeline 1118, the P2P timing of the UE may be similar to the WAN TX timing. Each group of consecutive uplink subframes may be used for WAN TX, P2P TX, and/or P2P RX. No transmission gaps may be needed if all uplink subframes in a given group are used for (i) WAN TX and/or P2P TX or (ii) only P2P RX. A transmission gap may be provided if the uplink subframes in a given group are used for both WAN/P2P TX and P2P RX. In a first design, the transmission gap may be obtained by (i) scheduling P2P RX to occur in the last uplink subframe of a group (e.g., subframe 8) and (ii) puncturing or deleting the last symbol of the data transmission sent in the immediately preceding uplink subframe (e.g., subframe 7). In a second design, a transmission gap may be obtained by (i) scheduling WAN/P2P TX to occur in the last uplink subframe of a group (e.g., subframe 8) and (ii) puncturing the first symbol of the data transmission sent for WAN/P2P TX. However, since the first few symbols typically carry control data and the remaining symbols typically carry traffic data, it may be better to puncture the last symbol in the first design instead of the first symbol in the second design.

In one design, the last symbol of a transmission in a subframe may be punctured by configuring the UE to transmit a sounding reference signal (SRS), which is normally transmitted on the uplink in the last symbol period of a subframe. However, the UE would not actually transmit the SRS in order to obtain a transmission gap. By configuring the UE to transmit SRS, the UE may process data such that it can be sent in all but the last symbol period of a subframe, which may mitigate impact on data transmission performance due to puncturing. Hence, configuring the UE to transmit SRS may be used to conveniently puncture the last symbol of a transmission using a mechanism specified in LTE.

A timeline 1120 shows a design of obtaining transmission gaps by delaying the P2P timing by (Delta1−Delta3) relative to the WAN TX timing. Each group of consecutive uplink subframes may be used for WAN TX, P2P TX, and/or P2P RX. No transmission gaps may be needed if all uplink subframes in a given group are used for (i) WAN TX and/or P2P TX or (ii) only P2P RX. A transmission gap may be provided if the uplink subframes in a given group are used for both WAN/P2P TX and P2P RX. P2P TX or P2P RX may be scheduled in the last subframe of a group of consecutive uplink subframe. A transmission gap of (Delta1−Delta3) may be obtained for P2P RX occurring after WAN TX (e.g., as shown in subframes 1 and 2) due to the P2P timing being delayed by (Delta1−Delta3) relative to the WAN TX timing. A transmission gap of Delta3 may be obtained for P2P TX occurring before WAN RX (e.g., as shown in subframes 3 and 4) due to (i) the WAN TX timing being advanced by Delta1 relative to the WAN RX timing and (ii) the P2P timing being delayed by (Delta1−Delta3) relative to the WAN TX timing. Delta3 may be less than or equal to Delta1. In this case, different guard periods may be created for P2P TX to WAN RX transition and WAN TX to P2P RX transition.

For FDD, different downlink spectrum and uplink spectrum may be used for WAN downlink and WAN uplink, respectively. Hence, no transmission gaps are needed between WAN TX and WAN RX. Some subframes for the uplink spectrum may be allocated for P2P communication. Hence, WAN TX can potentially interfere with P2P communication, and vice versa. Table 2 lists different ways of ensuring transmission gaps for different TX/RX and RX/TX switchpoints in FDD, in accordance with one design.

TABLE 2

Obtaining Transmission Gaps in FDD

| Transmission gap between . . . | Solution |
| --- | --- |
| WAN TX and WAN RX | Not a problem because different downlink spectrum and uplink spectrum. |
| WAN RX and WAN TX | |
| P2P TX and WAN RX | Not a problem because different downlink spectrum and uplink spectrum. |
| WAN RX and P2P TX | |
| WAN TX and P2P RX | Advance P2P timing relative to WAN TX timing and puncture last symbol, or use special subframe, or delay P2P timing relative to WAN TX timing. |
| P2P RX and WAN TX | Advance P2P timing relative to WAN TX timing, or use special subframe. |
| P2P TX and P2P RX | Schedule to avoid this. |
| P2P RX and P2P TX | Schedule to avoid this. |

Figure 12A:
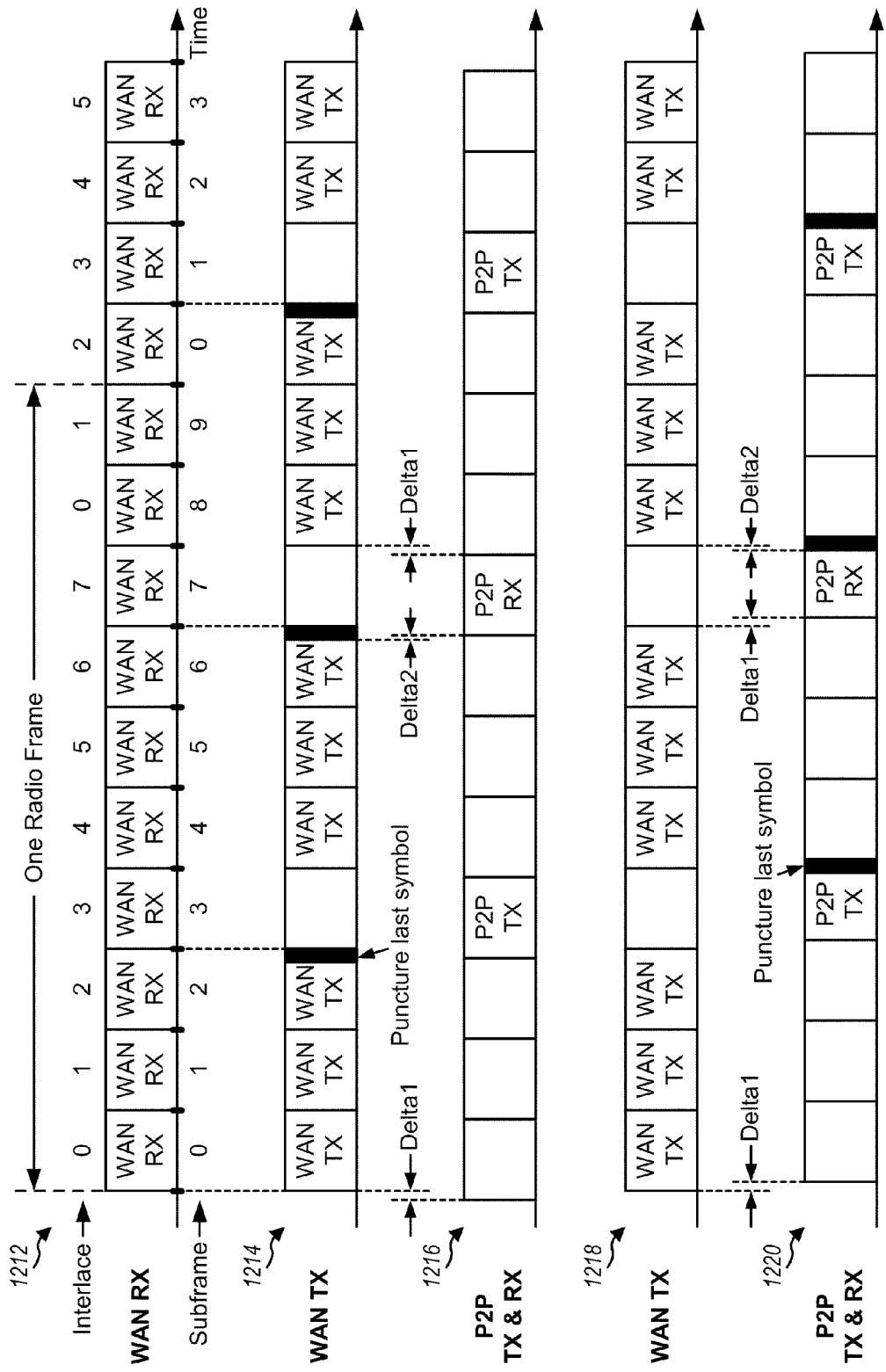
FIG. 12A to 12C show some schemes for obtaining transmission gaps in FDD.

FIG. 12A shows several designs of obtaining transmission gaps for TX/RX and RX/TX switchpoints of interest in FDD. FIG. 12A assumes the subframe allocation shown in FIG. 7, with interlaces 3 and 7 for the uplink spectrum being allocated to P2P communication. FIG. 12A also assumes a round trip delay of zero for simplicity.

A WAN RX timeline 1212 shows the UE potentially receiving data from an eNB in all subframes for the downlink spectrum. A WAN TX timeline 1214 shows the UE potentially transmitting data to the eNB in subframes of interlaces 0-2 and 4-6.

A P2P timeline 1216 shows the UE having its P2P timing advanced by Delta1 relative to the WAN TX timing. The UE may potentially transmit data to a peer UE in some subframes for the uplink spectrum and receive data from the peer UE in other subframes for the uplink spectrum. A transmission gap of Delta1 may be obtained between P2P RX and WAN TX (e.g., in subframes 7 and 8) by advancing the P2P timing by Delta1 relative to the WAN TX timing. A transmission gap of Delta2 may be obtained between WAN TX and P2P RX (e.g., in subframes 6 and 7) by puncturing the last symbol of a data transmission sent to an eNB (e.g., in subframe 6), where Delta2=Tsym−Delta1, and Tsym is the duration of one symbol period. Delta1 may or may not be equal to Delta2. If the sum of Delta1 and Delta2 is small (e.g., around 5 to 10 micro-seconds), then a portion of the cyclic prefix (instead of an entire symbol period) may be used to obtain the transmission gap. Conversely, if the sum of Delta1 and Delta2 is large, then one symbol period may be used to obtain the transmission gap.

A WAN TX timeline 1218 shows the UE potentially transmitting data to the eNB in subframes of interlaces 0-2 and 4-6, without having to delete the last portion of any WAN transmissions. A P2P timeline 1220 shows the UE having its P2P timing delayed by Delta1 relative to the WAN TX timing. A transmission gap of Delta1 may be obtained between WAN TX and P2P RX (e.g., in subframes 6 and 7) by delaying the P2P timing by Delta1 relative to the WAN TX timing. A transmission gap of Delta2 may be obtained between P2P RX and WAN TX (e.g., in subframes 7 and 8) by puncturing the last symbol of a data transmission sent for P2P communication (e.g., in subframe 7).

The design shown by P2P timeline 1214 may impact WAN communication by puncturing the last symbols of WAN transmissions (e.g., in subframes 2 and 6). The design shown by P2P timeline 1220 may avoid impact to WAN communication by puncturing the last symbols of P2P transmissions (e.g., in subframes 3 and 7). For both designs, the last symbol of a transmission in a subframe may be punctured by configuring a UE to transmit SRS, albeit without actually transmitting SRS in order to obtain a transmission gap.

Figure 12B:
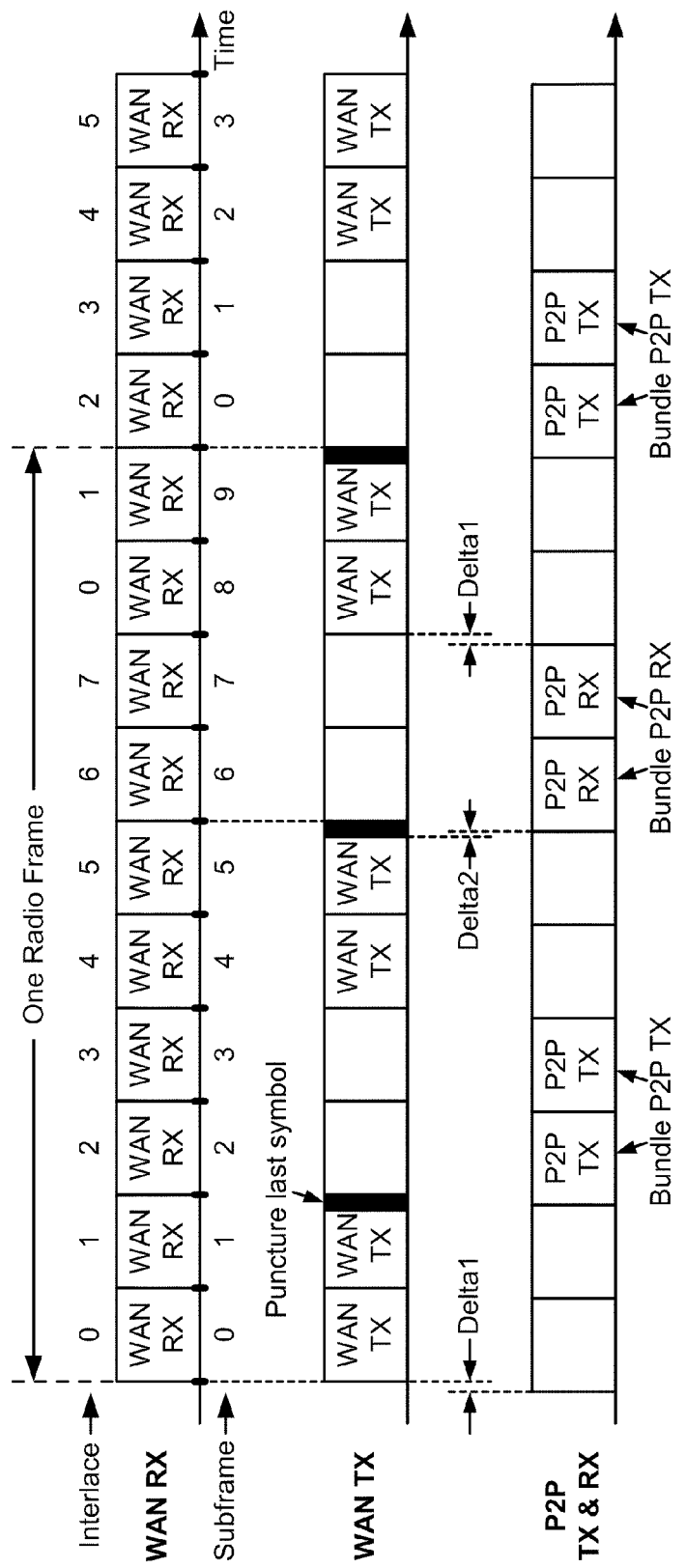

FIG. 12B shows a design of reducing the number of TX/RX and RX/TX switchpoints by bundling P2P TX subframes and P2P RX subframes. In the example shown in FIG. 12B, two consecutive interlaces 3 and 4 for the uplink spectrum may be allocated to P2P communication. A UE may transmit to a peer UE in two consecutive subframes of interlaces 3 and 4, then receive from the peer UE in two consecutive subframes for interlaces 3 and 4, etc. By bundling P2P TX subframes and P2P RX subframes, the number of transmission gaps may be reduced by one half. However, the HARQ transmission timeline may be extended (e.g., doubled) as compared to the designs shown in FIG. 12A.

Figure 12C:
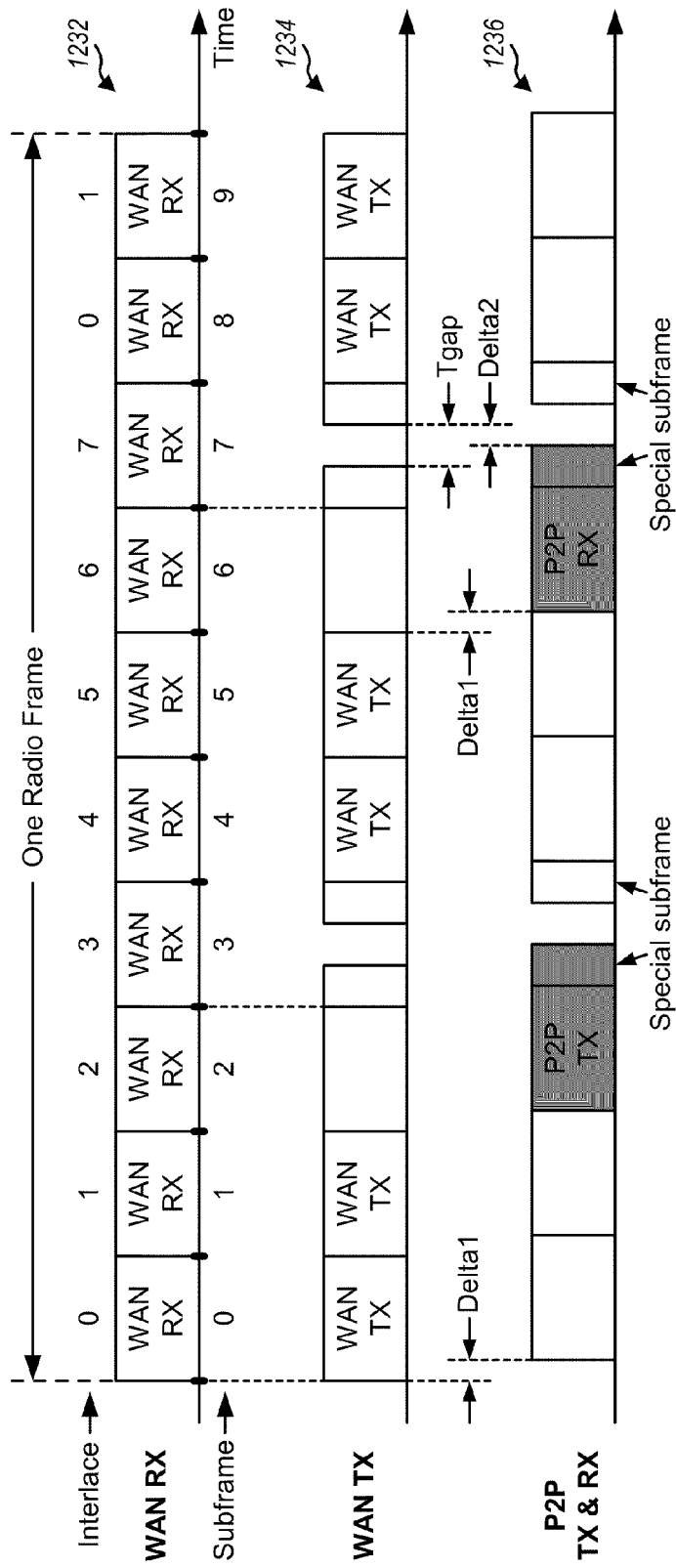

FIG. 12C shows a design of obtaining transmission gaps for TX/RX and RX/TX switchpoints using special subframes. In the example shown in FIG. 12C, two interlaces 2 and 6 for the uplink spectrum may be allocated to P2P communication. Interlaces 3 and 7 may be defined to include special subframes.

A WAN RX timeline 1232 shows the UE potentially receiving data from an eNB in all subframes for the downlink spectrum. A WAN TX timeline 1234 shows the UE potentially transmitting data to the eNB in subframes of interlaces 0, 1, 4 and 5 and also in the uplink portion of the special subframes in interlaces 3 and 7.

A P2P timeline 1236 shows the UE having its P2P timing delayed by Delta1 relative to its WAN TX timing. The UE may potentially transmit data to a peer UE in some subframes for the uplink spectrum and receive data from the peer UE in other subframes for the uplink spectrum. A transmission gap of Delta1 may be obtained between WAN TX and P2P RX (e.g., in subframes 5 and 6) by delaying the P2P timing by Delta1 relative to the WAN TX timing. A transmission gap of Delta2 may be obtained between P2P RX and WAN TX (e.g., in subframe 7) with the gap in the special subframe, where Delta2=Tgap−Delta1.

FIGS. 11 to 12C show various designs of obtaining transmission gaps at TX/RX and RX/TX switchpoints for concurrent WAN communication and P2P communication in TDD and FDD deployments. Transmission gaps may also be obtained in other manners.

In yet another aspect, physical channels and signals used for WAN communication may be reused for P2P communication. For example, the P2P downlink and/or P2P uplink may use a Physical Control Format Indicator Channel (PCFICH), a Physical HARQ Indicator Channel (PHICH), a Physical Downlink Control Channel (PDCCH), a Physical Downlink Shared Channel (PDSCH), a cell-specific reference signal (CRS), a UE-specific reference signal (UE-RS), and/or other physical channels and signals used for the downlink in LTE. The P2P uplink and/or P2P downlink may use a Physical Uplink Control Channel (PUCCH), a Physical Uplink Shared Channel (PUSCH), a Physical Random Access Channel (PRACH), a SRS, and/or other physical channels and signals used for the uplink in LTE. These various physical channels and signals are described in 3GPP TS 36.211, entitled "Evolved Universal Terrestrial Radio Access (E-UTRA); Physical Channels and Modulation," which is publicly available.

The techniques described herein may provide various advantages. First, by reusing WAN physical channels and signals for P2P communication, complexity of UEs to support P2P communication may be relatively low. Second, by using WAN frame structure and timeline for P2P communication, it may be possible to concurrently support WAN communication and P2P communication, as described above. Third, the techniques may be used to support P2P communication in both FDD and TDD deployments. Fourth, the techniques may be used to support P2P communication on a spectrum used for WAN communication (e.g., the uplink spectrum in a FDD deployment), or a dedicated spectrum for P2P, or an unlicensed spectrum. Fifth, the techniques may be adopted by other communication systems (e.g., Wi-Fi) to support P2P communication, so that UEs in different systems can communicate directly with P2P. The techniques described herein may also provide other advantages.

Figures 13, 14:
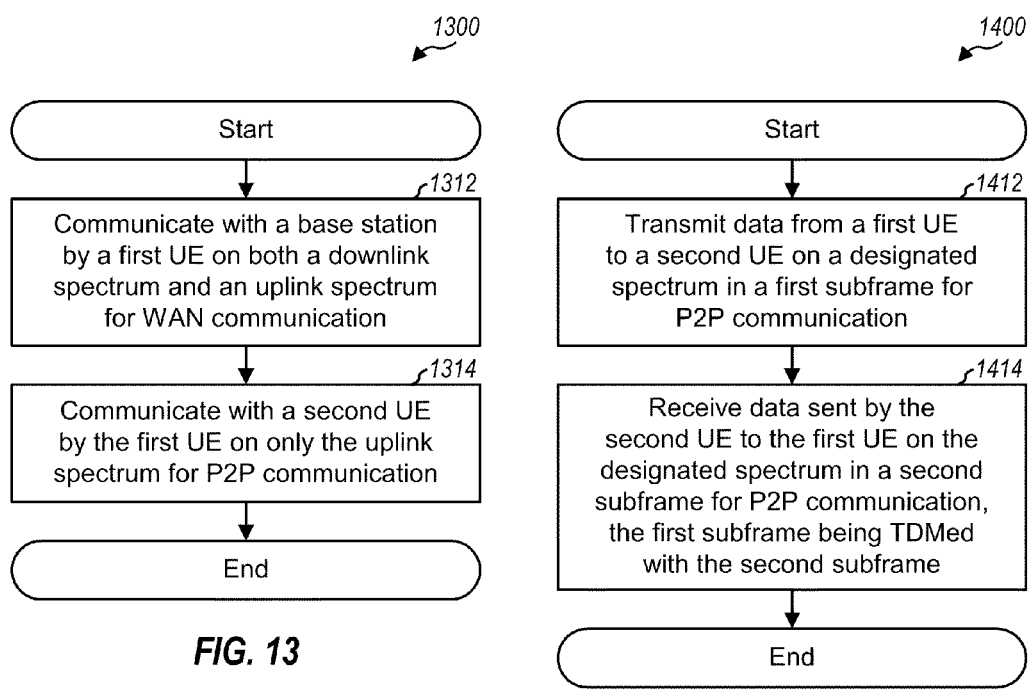
FIG. 13 shows a process for supporting P2P communication on uplink spectrum.
FIG. 14 shows a process for supporting P2P communication.

FIG. 13 shows a design of a process 1300 for supporting WAN communication and P2P communication. Process 1300 may be performed by a first UE (as described below) or by some other entity. The first UE may communicate with a base station on both a downlink spectrum and an uplink spectrum for WAN communication (block 1312). For block 1312, the first UE may receive data from the base station on the downlink spectrum and may transmit data to the base station on the uplink spectrum. The first UE may communicate with a second UE on only the uplink spectrum for P2P communication (block 1314). For block 1314, the first UE may transmit data to and receive data from the second UE on the uplink spectrum.

In one design, WAN communication and P2P communication may be frequency division multiplexed on the uplink spectrum. In this design, the first UE may (i) transmit data on a first portion of the uplink spectrum to the base station in block 1312 and (ii) transmit data on a second portion of the uplink spectrum to the second UE in block 1314, e.g., as shown in FIG. 6A.

In another design, WAN communication and P2P communication may be time division multiplexed on the uplink spectrum. In this design, the first UE may (i) transmit data on the uplink spectrum in a first subframe to the base station in block 1312 and (ii) transmit data on the uplink spectrum in a second subframe to the second UE in block 1314, e.g., as shown in FIG. 6B or 6C.

FIG. 14 shows a design of a process 1400 for supporting P2P communication. Process 1400 may be performed by a first UE (as described below) or by some other entity. The first UE may transmit data to a second UE on a designated spectrum in a first subframe for P2P communication (block 1412). The first UE may receive data sent by the second UE to the first UE on the designated spectrum in a second subframe for P2P communication (block 1414). The first subframe may be time division multiplexed with the second subframe.

In one design, the first and second subframes may correspond to two uplink subframes for a base station utilizing TDD. In this design, the designated spectrum may correspond to the spectrum used for both the downlink and uplink. In another design, the first and second subframes may correspond to two subframes for an uplink spectrum for a base station utilizing FDD. In this design, the designated spectrum may correspond to the uplink spectrum.

In one design, the first UE may communicate with the base station in a third subframe for WAN communication. WAN communication and P2P communication may be time division multiplexed, and the third subframe may be time division multiplexed with the first and second subframes FIG. 15 shows a design of a process 1500 for supporting WAN communication and P2P communication. Process 1500 may be performed by a first UE (as described below) or by some other entity. The first UE may communicate with (e.g., transmit data to and/or receive data from) a base station in at least one first subframe for WAN communication (block 1512). The first UE may communicate with a second UE in at least one second subframe, which may be time division multiplexed with the at least one first subframe (block 1514). In one design, the first UE may concurrently communicate with the base station and the second UE.

In one design, the base station may utilize FDD and may operate on a downlink spectrum and an uplink spectrum. The at least one first subframe and the at least one second subframe may correspond to subframes for the uplink spectrum. In another design, the base station may utilize TDD. The at least one second subframe may correspond to at least one uplink subframe and/or at least one downlink subframe for the base station.

FIG. 16 shows a design of a process 1600 for supporting P2P communication. Process 1600 may be performed by a first UE (as described below) or by some other entity. The first UE may send a first data transmission in a first subframe to a base station for WAN communication (block 1612). The first UE may receive a second data transmission sent in a second subframe by a second UE to the first UE for P2P communication (block 1614). The second data transmission may be separated from the first data transmission by a first transmission gap to separate WAN TX and P2P RX.

The first transmission gap may be obtained in various manners. In one design, the first transmission gap may be obtained by scheduling the second data transmission to be sent (i) at least one subframe later than the first data transmission or (ii) in a special subframe comprising a gap between a transmit portion and a receive portion of the subframe. Case (i) may be shown by WAN TX in subframe 8 and P2P RX in subframe 2 of the next radio frame in timeline 1116 in FIG. 11. In another design, the first UE may delete a last portion of the first data transmission to obtain the first transmission gap, e.g., as shown by WAN TX in subframe 7 in timeline 1118 in FIG. 11. The first UE may delete the last symbol period of the first data transmission based on a SRS configuration for the first UE. In yet another design, the first UE may delay its transmit timing for P2P communication relative to its transmit timing for WAN communication to obtain the first transmission gap, e.g., as shown by WAN TX in subframe 7 and P2P RX in subframe 8 in timeline 1120 in FIG. 11. In yet another design, the first UE may advance its transmit timing for P2P communication relative to its transmit timing for WAN communication. The first UE may obtain the first transmission gap by deleting the last portion of the first data transmission, e.g., as shown by WAN TX in subframe 6 and P2P RX in subframe 7 in timelines 1214 and 1216 FIG. 12A. In yet another design, the first transmission gap may be obtained by the first or second data transmission being sent in a special subframe comprising a gap between a transmit portion and a receive portion of the subframe, e.g., as shown in FIG. 12C. The first transmission gap may also be obtained in other manners, e.g., as listed in Tables 1 and 2 and described above.

In one design, the first UE may receive a third data transmission sent in a third subframe by the second UE to the first UE for P2P communication (block 1616). The first UE may send a fourth data transmission in a fourth subframe to the base station for WAN communication (block 1618). The fourth data transmission may be separated from the third data transmission by a second transmission gap to separate P2P RX and WAN TX. The second transmission gap may be obtained in various manners, as described above.

In one design, the first UE may advance its transmit timing for WAN communication relative to its receive timing for WAN communication, e.g., as shown by timeline 1114 in FIG. 11. This may provide a transmission gap between WAN TX and WAN RX for the first UE. A transmission gap between WAN RX and WAN TX may be obtained by use of special subframe, e.g., as shown in FIG. 11.

Figure 17B:
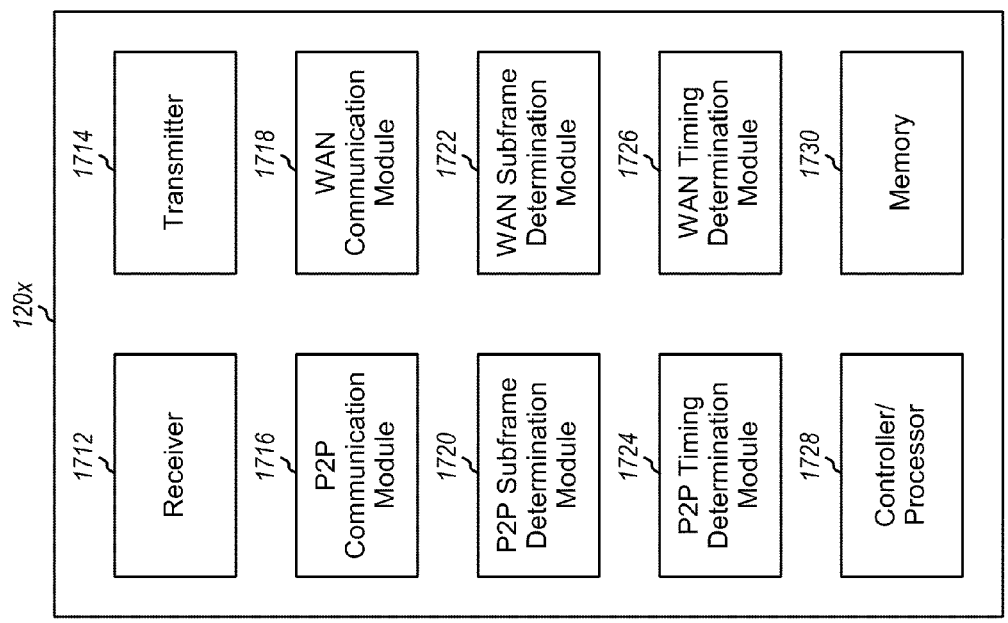
FIG. 17B shows a block diagram of a base station.
Figure 17A:
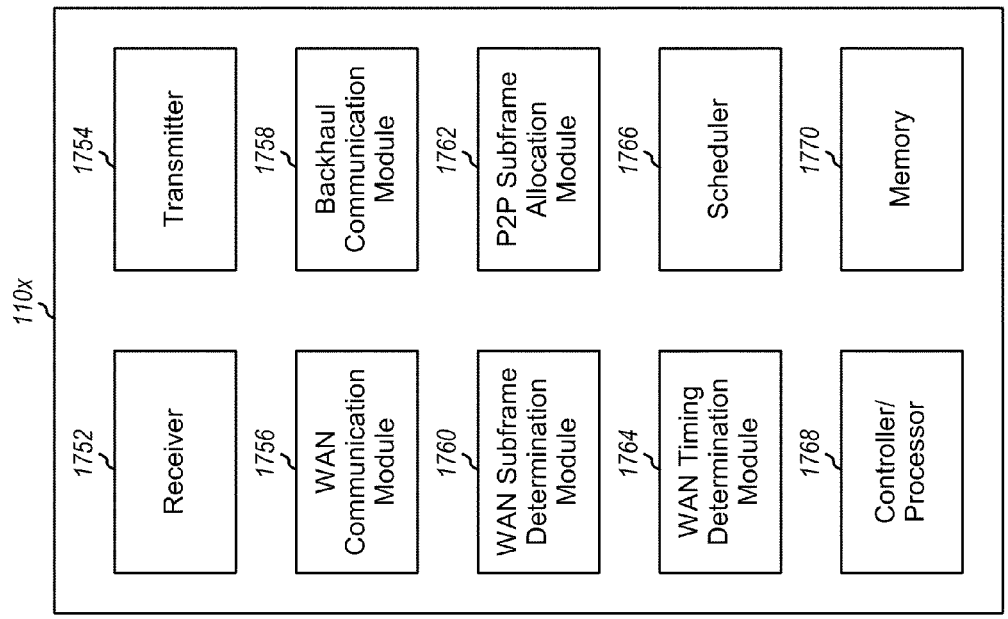
FIG. 17A shows a block diagram of a UE.

FIG. 17A shows a block diagram of a design of a UE 120x, which may be one of the UEs in FIG. 1. Within UE 120x, a receiver 1712 may receive P2P signals transmitted by other UEs for P2P communication and downlink signals transmitted by eNBs for WAN communication. A transmitter 1714 may transmit P2P signals to other UEs for P2P communication and uplink signals to eNBs for WAN communication. A module 1716 may support P2P communication, e.g., generate and process signals used for P2P communication. A module 1718 may support WAN communication, e.g., generate and process signals used for WAN communication. A module 1720 may determine subframes allocated for P2P communication, subframes used for P2P downlink, and subframes used for P2P uplink. A module 1722 may determine subframes available for WAN communication. A module 1724 may determine P2P timing of UE 120x, which may be aligned, advanced, or delayed relative to WAN TX timing. A module 1726 may determine WAN TX timing and WAN RX timing of UE 120x. The various modules within UE 120x may operate as described above. A controller/processor 1728 may direct the operation of various modules within UE 120x. A memory 1730 may store data and program codes for UE 120x.

FIG. 17B shows a block diagram of a design of an eNB 110x, which may be one of the eNBs in FIG. 1. Within eNB 110x, a receiver 1752 may receive uplink signals transmitted by UEs to support WAN communication. A transmitter 1754 may transmit downlink signals to UEs to support WAN communication. A module 1756 may support WAN communication for UEs, e.g., generate and process signals used for WAN communication. A module 1758 may support communication with other network entities (e.g., eNBs) via the backhaul. A module 1760 may determine subframes available for WAN communication. A module 1762 may allocate subframes to P2P communication. A module 1764 may determine WAN TX timing and WAN RX timing of eNB 110x. The various modules within eNB 110x may operate as described above. A controller/processor 1768 may direct the operation of various modules within eNB 110x. A memory 1770 may store data and program codes for eNB 110x. A scheduler 1766 may schedule UEs for WAN communication and/or P2P communication and may assign resources to the scheduled UEs.

The modules within UE 120x in FIG. 17A and eNB 110x in FIG. 17B may comprise processors, electronic devices, hardware devices, electronic components, logical circuits, memories, software codes, firmware codes, etc., or any combination thereof.

Figure 18:
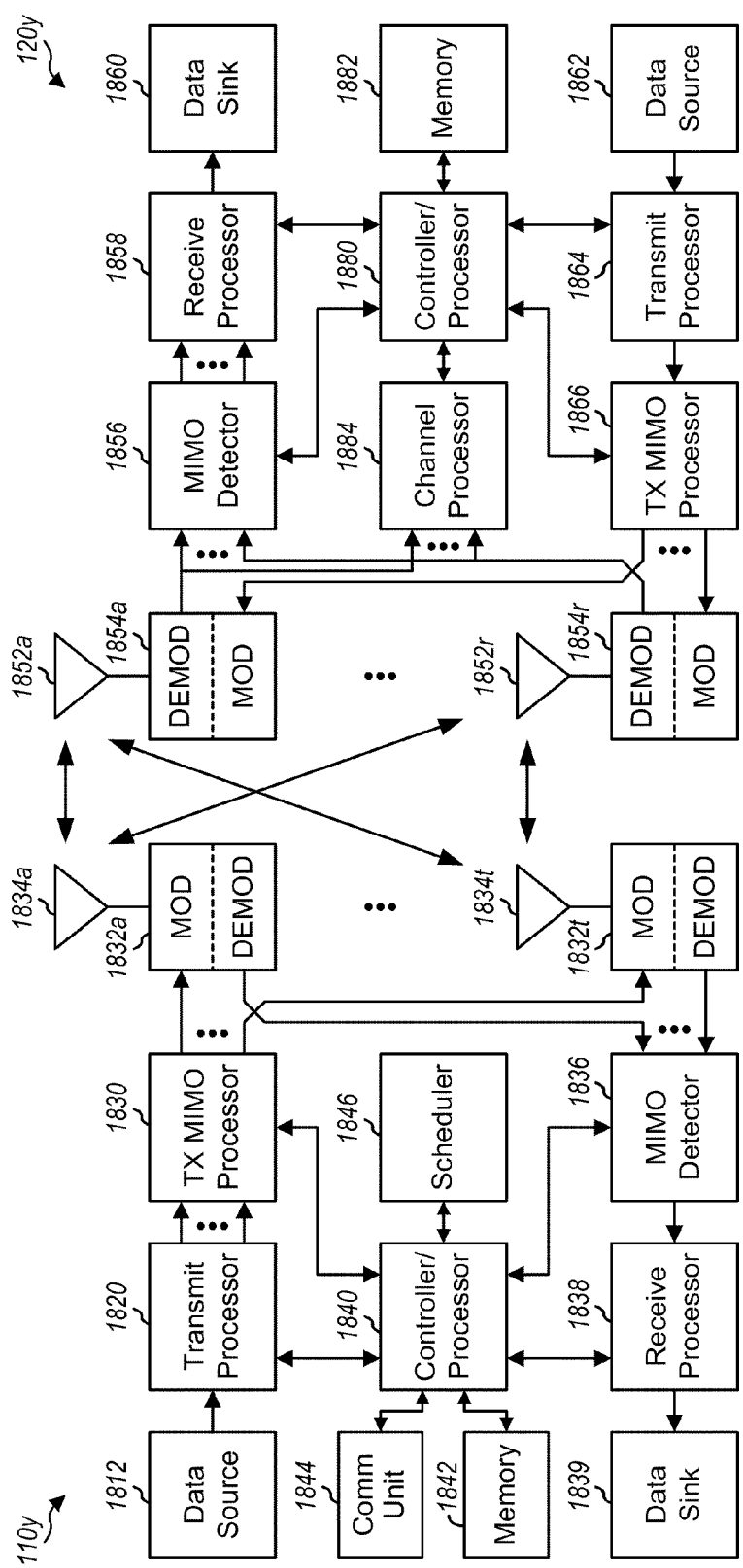
FIG. 18 shows another block diagram of a base station and a UE.

FIG. 18 shows a block diagram of a design of an eNB 110y and a UE 120y, which may be one of the eNBs and one of the UEs in FIG. 1. ENB 110y may be equipped with T antennas 1834a through 1834t, and UE 120y may be equipped with R antennas 1852a through 1852r, where in general T≥1 and R≥1.

At eNB 110y, a transmit processor 1820 may receive data for one or more UEs from a data source 1812 and control information (e.g., messages supporting P2P communication, WAN communication, etc.) from a controller/processor 1840. Processor 1820 may process (e.g., encode and modulate) the data and control information to obtain data symbols and control symbols, respectively. Processor 1820 may also generate reference symbols for synchronization signals, reference signals, etc. A transmit (TX) multiple-input multiple-output (MIMO) processor 1830 may perform spatial processing (e.g., precoding) on the data symbols, the control symbols, and/or the reference symbols, if applicable, and may provide T output symbol streams to T modulators (MODs) 1832a through 1832t. Each modulator 1832 may process a respective output symbol stream (e.g., for OFDM, etc.) to obtain an output sample stream. Each modulator 1832 may further process (e.g., convert to analog, amplify, filter, and upconvert) the output sample stream to obtain a downlink signal. T downlink signals from modulators 1832a through 1832t may be transmitted via T antennas 1834a through 1834t, respectively.

At UE 120y, antennas 1852a through 1852r may receive the downlink signals from eNB 110y and other eNBs and/or P2P signals from other UEs and may provide received signals to demodulators (DEMODs) 1854a through 1854r, respectively. Each demodulator 1854 may condition (e.g., filter, amplify, downconvert, and digitize) a respective received signal to obtain input samples. Each demodulator 1854 may further process the input samples (e.g., for OFDM, SC-FDM, etc.) to obtain received symbols. A MIMO detector 1856 may obtain received symbols from all R demodulators 1854a through 1854r, perform MIMO detection on the received symbols if applicable, and provide detected symbols. A receive processor 1858 may process (e.g., demodulate and decode) the detected symbols, provide decoded data for UE 120y to a data sink 1860, and provide decoded control information to a controller/processor 1880. A channel processor 1884 may detect P2P signals from P2P UEs and downlink signals from eNBs. Processor 1884 may measure the received signal strength of the detected P2P signals and downlink signals and may determine channel gains for the detected P2P UEs and eNBs.

On the uplink, at UE 120y, a transmit processor 1864 may receive data from a data source 1862 and control information (e.g., messages for P2P communication, WAN communication, etc.) from controller/processor 1880. Processor 1864 may process (e.g., encode and modulate) the data and control information to obtain data symbols and control symbols, respectively. Processor 1864 may also generate symbols for a reference signal, a proximity detection signal, etc. The symbols from transmit processor 1864 may be precoded by a TX MIMO processor 1866 if applicable, further processed by modulators 1854a through 1854r (e.g., for SC-FDM, OFDM, etc.), and transmitted to eNB 110y, other eNBs, and/or other UEs. At eNB 110y, the uplink signals from UE 120y and other UEs may be received by antennas 1834, processed by demodulators 1832, detected by a MIMO detector 1836 if applicable, and further processed by a receive processor 1838 to obtain decoded data and control information sent by UE 120y and other UEs. Processor 1838 may provide the decoded data to a data sink 1839 and the decoded control information to controller/processor 1840.

Controllers/processors 1840 and 1880 may direct the operation at eNB 110y and UE 120y, respectively. Processor 1880 and/or other processors and modules at UE 120y may perform or direct process 1300 in FIG. 13, process 1400 in FIG. 14, process 1500 in FIG. 15, process 1600 in FIG. 16, and/or other processes for the techniques described herein. Memories 1842 and 1882 may store data and program codes for eNB 110y and UE 120y, respectively. A communication (Comm) unit 1844 may enable eNB 110y to communicate with other network entities. A scheduler 1846 may schedule UEs for WAN communication and P2P communication.

In one configuration, apparatus 120x and/or 120y for wireless communication may include means for communicating with a base station by a first UE on both a downlink spectrum and an uplink spectrum for WAN communication, and means for communicating with a second UE by the first UE on only the uplink spectrum for P2P communication.

In another configuration, apparatus 120x and/or 120y for wireless communication may include means for transmitting data from a first UE to a second UE on a designated spectrum in a first subframe for P2P communication, and means for receiving data sent by the second UE to the first UE on the designated spectrum in a second subframe for P2P communication, the first subframe being TDMed with the second subframe.

In yet another configuration, apparatus 120x and/or 120y for wireless communication may include means for communicating with a base station by a first UE in at least one first subframe for WAN communication, and means for communicating with a second UE by the first UE in at least one second subframe, the at least one first subframe being TDMed with the at least one second subframe.

In yet another configuration, apparatus 120x and/or 120y for wireless communication may include means for sending a first data transmission in a first subframe by a first UE to a base station for WAN communication, means for receiving a second data transmission sent in a second subframe by a second UE to the first UE for P2P communication, means for receiving a third data transmission sent in a third subframe by the second UE to the first UE for P2P communication, and means for sending a fourth data transmission in a fourth subframe by the first UE to the base station for WAN communication. The second data transmission may be separated from the first data transmission by a first transmission gap. The fourth data transmission may be separated from the third data transmission by a second transmission gap.

In an aspect, the aforementioned means may be processor(s) 1858, 1864 and/or 1880 at UE 120y, which may be configured to perform the functions recited by the aforementioned means. In another aspect, the aforementioned means may be one or more modules or any apparatus configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   communicating with a base station by a first user equipment (UE) on both a downlink spectrum and an uplink spectrum for wide area network (WAN) communication; and
   communicating with a second UE by the first UE on only the uplink spectrum for peer-to-peer (P2P) communication,
   wherein the communicating with the base station comprises transmitting data on the uplink spectrum in a first subframe to the base station, and wherein the communicating with the second UE comprises transmitting data on the uplink spectrum in a second subframe to the second UE, and
   wherein the communicating with the base station and the communicating with the second UE occur concurrently.

2. The method of claim 1, wherein the communicating with the base station comprises transmitting data on a first portion of the uplink spectrum to the base station, and wherein the communicating with the second UE comprises transmitting data on a second portion of the uplink spectrum to the second UE.

3. An apparatus for wireless communication, comprising:
   means for communicating with a base station by a first user equipment (UE) on both a downlink spectrum and an uplink spectrum for wide area network (WAN) communication; and
   means for communicating with a second UE by the first UE on only the uplink spectrum for peer-to-peer (P2P) communication,
   wherein the means for communicating with the base station comprises means for transmitting data on the uplink spectrum in a first subframe to the base station, and
   wherein the means for communicating with the second UE comprises means for transmitting data on the uplink spectrum in a second subframe to the second UE, and
   wherein the communicating with the base station and the communicating with the second UE occur concurrently.

4. The apparatus of claim 3, wherein the means for communicating with the base station comprises means for transmitting data on a first portion of the uplink spectrum to the base station, and wherein the means for communicating with the second UE comprises means for transmitting data on a second portion of the uplink spectrum to the second UE.

5. An apparatus for wireless communication, comprising:
   at least one processor configured to communicate with a base station by a first user equipment (UE) on both a downlink spectrum and an uplink spectrum for wide area network (WAN) communication, and to communicate with a second UE by the first UE on only the uplink spectrum for peer-to-peer (P2P) communication,
   wherein the at least one processor is configured to transmit data on the uplink spectrum in a first subframe to the base station, and to transmit data on the uplink spectrum in a second subframe to the second UE, and
   wherein the communicating with the base station and the communicating with the second UE occur concurrently.

6. The apparatus of claim 5, wherein the at least one processor is configured to transmit data on a first portion of the uplink spectrum to the base station, and to transmit data on a second portion of the uplink spectrum to the second UE.

7. A computer program product, comprising:
   a non-transitory computer-readable medium comprising:
      code for causing at least one processor to communicate with a base station by a first user equipment (UE) on both a downlink spectrum and an uplink spectrum for wide area network (WAN) communication, code for causing the at least one processor to communicate with a second UE by the first UE on only the uplink spectrum for peer-to-peer (P2P) communication, code for causing the at least one processor to transmit data on the uplink spectrum in a first subframe to the base station, and to transmit data on the uplink spectrum in a second subframe to the second UE, and wherein the communicating with the base station and the communicating with the second UE occur concurrently.

8. A method for wireless communication, comprising:

transmitting data from a first user equipment (UE) to a second UE on a designated spectrum in a first subframe for peer-to-peer (P2P) communication;

receiving data sent by the second UE to the first UE on the designated spectrum in a second subframe for P2P communication, the first subframe being time division multiplexed (TDM) with the second subframe; and communicating with a base station by the first UE in a third subframe for wide area network (WAN) communication, wherein the communicating with the base station and the transmitting data from the first UE to the second UE occur concurrently.

9. The method of claim 8, wherein the first and second subframes correspond to two uplink subframes for the base station utilizing time division duplexing (TDD).

10. The method of claim 8, wherein the first and second subframes correspond to two subframes for an uplink spectrum for the base station utilizing frequency division duplexing (FDD) and operating on the uplink spectrum and a downlink spectrum.

11. The method of claim 8, wherein the third subframe is time division multiplexed with the first and second subframes.

12. An apparatus for wireless communication, comprising:

means for transmitting data from a first user equipment (UE) to a second UE on a designated spectrum in a first subframe for peer-to-peer (P2P) communication;

means for receiving data sent by the second UE to the first UE on the designated spectrum in a second subframe for P2P communication, the first subframe being time division multiplexed (TDM) with the second subframe; and means for communicating with a base station by the first UE in a third subframe for wide area network (WAN) communication, wherein the communicating with the base station and the transmitting data from the first UE to the second UE occur concurrently.

13. The apparatus of claim 12, wherein the first and second subframes correspond to two uplink subframes for the base station utilizing time division duplexing (TDD).

14. The apparatus of claim 12, wherein the first and second subframes correspond to two subframes for an uplink spectrum for the base station utilizing frequency division duplexing (FDD) and operating on the uplink spectrum and a downlink spectrum.

15. An apparatus for wireless communication, comprising:

at least one processor configured to transmit data from a first user equipment (UE) to a second UE on a designated spectrum in a first subframe for peer-to-peer (P2P) communication, and to receive data sent by the second UE to the first UE on the designated spectrum in a second subframe for P2P communication, the first subframe being time division multiplexed (TDM) with the second subframe, wherein the at least one processor is configured to communicate with a base station by the first UE in a third subframe for wide area network (WAN) communication, and wherein the communicating with the base station and the transmitting data from the first UE to the second UE occur concurrently.

16. The apparatus of claim 15, wherein the first and second subframes correspond to two uplink subframes for the base station utilizing time division duplexing (TDD).

17. The apparatus of claim 15, wherein the first and second subframes correspond to two subframes for an uplink spectrum for the base station utilizing frequency division duplexing (FDD) and operating on the uplink spectrum and a downlink spectrum.

18. A computer program product, comprising:

a non-transitory computer-readable medium comprising:

code for causing at least one processor to transmit data from a first user equipment (UE) to a second UE on a designated spectrum in a first subframe for peer-to-peer (P2P) communication;

code for causing the at least one processor to receive data sent by the second UE to the first UE on the designated spectrum in a second subframe for P2P communication, the first subframe being time division multiplexed (TDM) with the second subframe; and code for causing the at least one processor to communicate with a base station by the first UE in a third subframe for wide area network (WAN) communication, wherein the communicating with the base station and the transmitting data from the first UE to the second UE occur concurrently.

19. A method for wireless communication, comprising:

communicating with a base station by a first user equipment (UE) in at least one first subframe for wide area network (WAN) communication; and communicating with a second UE by the first UE in at least one second subframe, the at least one first subframe being time division multiplexed (TDM) with the at least one second subframe, wherein the communicating with the base station and the communicating with the second UE occur concurrently.

20. The method of claim 19, wherein the base station utilizes frequency division duplexing (FDD) and operates on a downlink spectrum and an uplink spectrum, and wherein the at least one first subframe and the at least one second subframe correspond to subframes for the uplink spectrum.

21. The method of claim 19, wherein the base station utilizes time division duplexing (TDD), and wherein the at least one second subframe corresponds to at least one downlink subframe for the base station, or at least one uplink subframe for the base station, or both at least one downlink subframe and at least one uplink subframe.

22. An apparatus for wireless communication, comprising:

means for communicating with a base station by a first user equipment (UE) in at least one first subframe for wide area network (WAN) communication; and means for communicating with a second UE by the first UE in at least one second subframe, the at least one first subframe being time division multiplexed (TDM) with the at least one second subframe, wherein communication with the base station and communication with the second UE occur concurrently.

23. The apparatus of claim 22, wherein the base station utilizes frequency division duplexing (FDD) and operates on a downlink spectrum and an uplink spectrum, and wherein the at least one first subframe and the at least one second subframe correspond to subframes for the uplink spectrum.

24. The apparatus of claim 22, wherein the base station utilizes time division duplexing (TDD), and wherein the at least one second subframe corresponds to at least one downlink subframe for the base station, or at least one uplink subframe for the base station, or both at least one downlink subframe and at least one uplink subframe.

25. An apparatus for wireless communication, comprising:
at least one processor configured to communicate with a base station by a first user equipment (UE) in at least one first subframe for wide area network (WAN) communication, and to communicate with a second UE by the first UE in at least one second subframe, the at least one first subframe being time division multiplexed (TDM) with the at least one second subframe,
wherein the at least one processor is configured to communicate with the base station and the second UE occur concurrently.

26. The apparatus of claim 25, wherein the base station utilizes frequency division duplexing (FDD) and operates on a downlink spectrum and an uplink spectrum, and wherein the at least one first subframe and the at least one second subframe correspond to subframes for the uplink spectrum.

27. The apparatus of claim 25, wherein the base station utilizes time division duplexing (TDD), and wherein the at least one second subframe corresponds to at least one downlink subframe for the base station, or at least one uplink subframe for the base station, or both at least one downlink subframe and at least one uplink subframe.

28. A computer program product, comprising:
a non-transitory computer-readable medium comprising:
code for causing at least one processor to communicate with a base station by a first user equipment (UE) in at least one first subframe for wide area network (WAN) communication, and
code for causing the at least one processor to communicate with a second UE by the first UE in at least one second subframe, the at least one first subframe being time division multiplexed (TDM) with the at least one second subframe,
wherein the at least one processor is configured to communicate with the base station and the second UE occur concurrently.

29. A method for wireless communication, comprising:
sending a first data transmission in a first subframe by a first user equipment (UE) to a base station for wide area network (WAN) communication; and
receiving a second data transmission sent in a second subframe by a second UE to the first UE for peer-to-peer (P2P) communication, the second data transmission being separated from the first data transmission by a transmission gap,
wherein the first subframe and the second subframe are consecutive subframes of a frame structure.

30. The method of claim 29, wherein the transmission gap is obtained by scheduling the second data transmission to be sent at least one subframe later than the first data transmission, or to be sent in a subframe comprising a gap between a transmit portion and a receive portion of the subframe.

31. The method of claim 29, further comprising:
deleting a last portion of the first data transmission to obtain the transmission gap.

32. The method of claim 31, wherein the deleting the last portion of the first data transmission comprises deleting a last symbol period of the first data transmission based on a sounding reference signal (SRS) configuration for the first UE.

33. The method of claim 29, further comprising:
delaying transmit timing of the first UE for P2P communication relative to transmit timing of the first UE for WAN communication.

34. The method of claim 29, further comprising:
advancing transmit timing of the first UE for P2P communication relative to transmit timing of the first UE for WAN communication.

35. The method of claim 34, wherein the transmission gap is obtained by deleting a last portion of the first data transmission.

36. The method of claim 29, wherein the transmission gap is obtained by the first or second data transmission being sent in a subframe comprising a gap between a transmit portion and a receive portion of the subframe.

37. The method of claim 29, further comprising:
receiving a third data transmission sent in a third subframe by the second UE to the first UE for P2P communication; and
sending a fourth data transmission in a fourth subframe by the first UE to the base station for WAN communication, the fourth data transmission being separated from the third data transmission by a second transmission gap.

38. The method of claim 29, further comprising:
advancing transmit timing of the first UE for WAN communication relative to receive timing of the first UE for WAN communication.

39. An apparatus for wireless communication, comprising:
means for sending a first data transmission in a first subframe by a first user equipment (UE) to a base station for wide area network (WAN) communication; and
means for receiving a second data transmission sent in a second subframe by a second UE to the first UE for peer-to-peer (P2P) communication, the second data transmission being separated from the first data transmission by a transmission gap,
wherein the first subframe and the second subframe are consecutive subframes of a frame structure.

40. The apparatus of claim 39, further comprising:
means for deleting a last portion of the first data transmission to obtain the transmission gap.

41. The apparatus of claim 39, further comprising:
means for delaying transmit timing of the first UE for P2P communication relative to transmit timing of the first UE for WAN communication.

42. The apparatus of claim 39, further comprising:
means for advancing transmit timing of the first UE for P2P communication relative to transmit timing of the first UE for WAN communication.

43. The apparatus of claim 39, further comprising:
means for receiving a third data transmission sent in a third subframe by the second UE to the first UE for P2P communication; and
means for sending a fourth data transmission in a fourth subframe by the first UE to the base station for WAN communication, the fourth data transmission being separated from the third data transmission by a second transmission gap.

44. An apparatus for wireless communication, comprising:
at least one processor configured to send a first data transmission in a first subframe by a first user equipment (UE) to a base station for wide area network (WAN) communication, and to receive a second data transmission sent in a second subframe by a second UE to the first UE for peer-to-peer (P2P) communication, the second data transmission being separated from the first data transmission by a transmission gap, wherein the first subframe and the second subframe are consecutive subframes of a frame structure.

45. The apparatus of claim 44, wherein the at least one processor is configured to delete a last portion of the first data transmission to obtain the transmission gap.

46. The apparatus of claim 44, wherein the at least one processor is configured to delay transmit timing of the first UE for P2P communication relative to transmit timing of the first UE for WAN communication.

47. The apparatus of claim 44, wherein the at least one processor is configured to advance transmit timing of the first UE for P2P communication relative to transmit timing of the first UE for WAN communication.

48. The apparatus of claim 44, wherein the at least one processor is configured to receive a third data transmission sent in a third subframe by the second UE to the first UE for P2P communication, and to send a fourth data transmission in a fourth subframe by the first UE to the base station for WAN communication, the fourth data transmission being separated from the third data transmission by a second transmission gap.

49. A computer program product, comprising:
a non-transitory computer-readable medium comprising:
code for causing at least one processor to send a first data transmission in a first subframe by a first user equipment (UE) to a base station for wide area network (WAN) communication, and
code for causing the at least one processor to receive a second data transmission sent in a second subframe by a second UE to the first UE for peer-to-peer (P2P) communication, the second data transmission being separated from the first data transmission by a transmission gap,
wherein the first subframe and the second subframe are consecutive subframes of a frame structure.

\* \* \* \* \*